US012115626B2

(12) United States Patent
Kusumoto

(10) Patent No.: US 12,115,626 B2
(45) Date of Patent: Oct. 15, 2024

(54) IMPACT TOOL

(71) Applicant: MAKITA CORPORATION, Anjo (JP)

(72) Inventor: Kihiro Kusumoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/176,892

(22) Filed: Mar. 1, 2023

(65) Prior Publication Data

US 2023/0364749 A1 Nov. 16, 2023

(30) Foreign Application Priority Data

May 16, 2022 (JP) ................................ 2022-080195

(51) Int. Cl.
*B25B 21/02* (2006.01)

(52) U.S. Cl.
CPC .................................... *B25B 21/02* (2013.01)

(58) Field of Classification Search
CPC ....... B25B 21/02; B25B 21/00; B25B 21/026; B25B 23/16; B25B 23/147; B25B 23/1475; B25B 23/1453; B25B 23/1405; B25B 19/00; B25D 11/04; B25D 11/066; B25D 16/00; B25D 16/003; B25D 16/006; B25D 2216/0023; B25F 5/026; B25F 5/001
See application file for complete search history.

(56) References Cited

U.S. PATENT DOCUMENTS

| | | | | |
|---|---|---|---|---|
| 2,792,732 A * | 5/1957 | Brucker | B25B 21/026 | 173/93.6 |
| 6,138,772 A * | 10/2000 | Miescher | B25D 16/00 | 173/205 |
| 11,213,934 B2 * | 1/2022 | Bandy | B25B 21/02 | |
| 2005/0173139 A1 * | 8/2005 | Furuta | B25D 16/006 | 173/48 |
| 2005/0199404 A1 * | 9/2005 | Furuta | B25B 21/00 | 173/93.5 |
| 2006/0090913 A1 * | 5/2006 | Furuta | B25D 16/003 | 173/48 |
| 2007/0056756 A1 * | 3/2007 | Chung | B25B 21/00 | 173/48 |

(Continued)

FOREIGN PATENT DOCUMENTS

| | | |
|---|---|---|
| JP | S64-000290 Y2 | 1/1989 |
| JP | 2018-187700 A | 11/2018 |

*Primary Examiner* — Dariush Seif
(74) *Attorney, Agent, or Firm* — Oliff PLC

(57) ABSTRACT

An impact tool has less size increase and improved striking efficiency. An impact tool includes a motor, a spindle rotatable with a rotational force from the motor and including a spindle shaft and a flange, an anvil, a hammer, first and second coil springs surrounding the spindle shaft, a cup washer, and a support ball. The anvil includes an anvil shaft to receive a tip tool and an anvil projection protruding radially outward from the anvil shaft. The hammer includes a hammer projection to strike the anvil projection in a rotation direction, a recess at a rear of the hammer, and a support groove inside the recess. The cup washer is located in the recess and supports front ends of the first and second coil springs. The support ball is located in the support groove and supports the cup washer.

18 Claims, 20 Drawing Sheets

(56) References Cited

U.S. PATENT DOCUMENTS

| | | | | |
|---|---|---|---|---|
| 2010/0000749 | A1* | 1/2010 | Andel | B25B 21/02 173/202 |
| 2010/0071923 | A1* | 3/2010 | Rudolph | B25D 16/006 173/48 |
| 2012/0132452 | A1* | 5/2012 | Hoop | B25B 21/026 173/93.5 |
| 2013/0087355 | A1* | 4/2013 | Oomori | B25B 21/02 173/94 |
| 2014/0346744 | A1* | 11/2014 | Herr | B25D 17/00 279/144 |
| 2014/0374130 | A1* | 12/2014 | Nakamura | B25B 21/026 173/176 |
| 2015/0343617 | A1* | 12/2015 | Kondo | B25B 21/02 173/93 |
| 2017/0326720 | A1* | 11/2017 | Kuroyanagi | B25F 5/021 |
| 2021/0023629 | A1* | 1/2021 | Kawai | B23B 31/1071 |
| 2021/0060755 | A1* | 3/2021 | Kawai | B25F 5/00 |
| 2021/0162571 | A1* | 6/2021 | Kondo | B25B 21/026 |

* cited by examiner

IMPACT TOOL

CROSS-REFERENCE TO RELATED APPLICATIONS

This application claims the benefit of priority to Japanese Patent Application No. 2022-080195, filed on May 16, 2022, the entire contents of which are hereby incorporated by reference.

BACKGROUND

1. Technical Field

The present disclosure relates to an impact tool.

2. Description of the Background

In the field of impact tools, a known impact wrench is described in Japanese Unexamined Patent Application Publication No. 2018-187700.

BRIEF SUMMARY

For improved operability of an impact tool, a technique is awaited for an impact tool with less size increase and improved striking efficiency.

One or more aspects of the present disclosure are directed to an impact tool with less size increase and improved striking efficiency.

A first aspect of the present disclosure provides an impact tool, including:

- a motor;
- a spindle rotatable with a rotational force from the motor, the spindle including
  - a spindle shaft, and
  - a flange at a rear of the spindle shaft;
- an anvil including
  - an anvil shaft located frontward from the spindle to receive a tip tool, and
  - an anvil projection protruding radially outward from the anvil shaft;
- a hammer supported by the spindle shaft, the hammer including
  - a hammer projection to strike the anvil projection in a rotation direction,
  - a recess at a rear of the hammer, and
  - a support groove inside the recess;
- a first coil spring and a second coil spring surrounding the spindle shaft;
- a cup washer located in the recess and supporting a front end of the first coil spring and a front end of the second coil spring; and
- a support ball located in the support groove and supporting the cup washer.

A second aspect of the present disclosure provides an impact tool, including:

- a motor;
- a spindle rotatable with a rotational force from the motor, the spindle including
  - a spindle shaft, and
  - a flange at a rear of the spindle shaft;
- an anvil including
  - an anvil shaft located frontward from the spindle to receive a tip tool, and
  - an anvil projection protruding radially outward from the anvil shaft;

- a hammer supported by the spindle shaft, the hammer including a hammer projection to strike the anvil projection in a rotation direction;
- a first coil spring and a second coil spring surrounding the spindle shaft;
- a washer facing a front surface of the flange and supporting a rear end of the first coil spring and a rear end of the second coil spring; and
- a support ball between the front surface of the flange and a rear surface of the washer, the support ball supporting the washer.

The impact tool according to the above aspects of the present disclosure has less size increase and improved striking efficiency.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an impact tool 1. The impact tool 1 includes a motor 6 as a power supply.

In the embodiments, a direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. The axial direction is from the rear to the front (first axial direction) or from the front to the rear (second axial direction). A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outside or radially outward for convenience.

First Embodiment

Impact Tool

Figure 1:
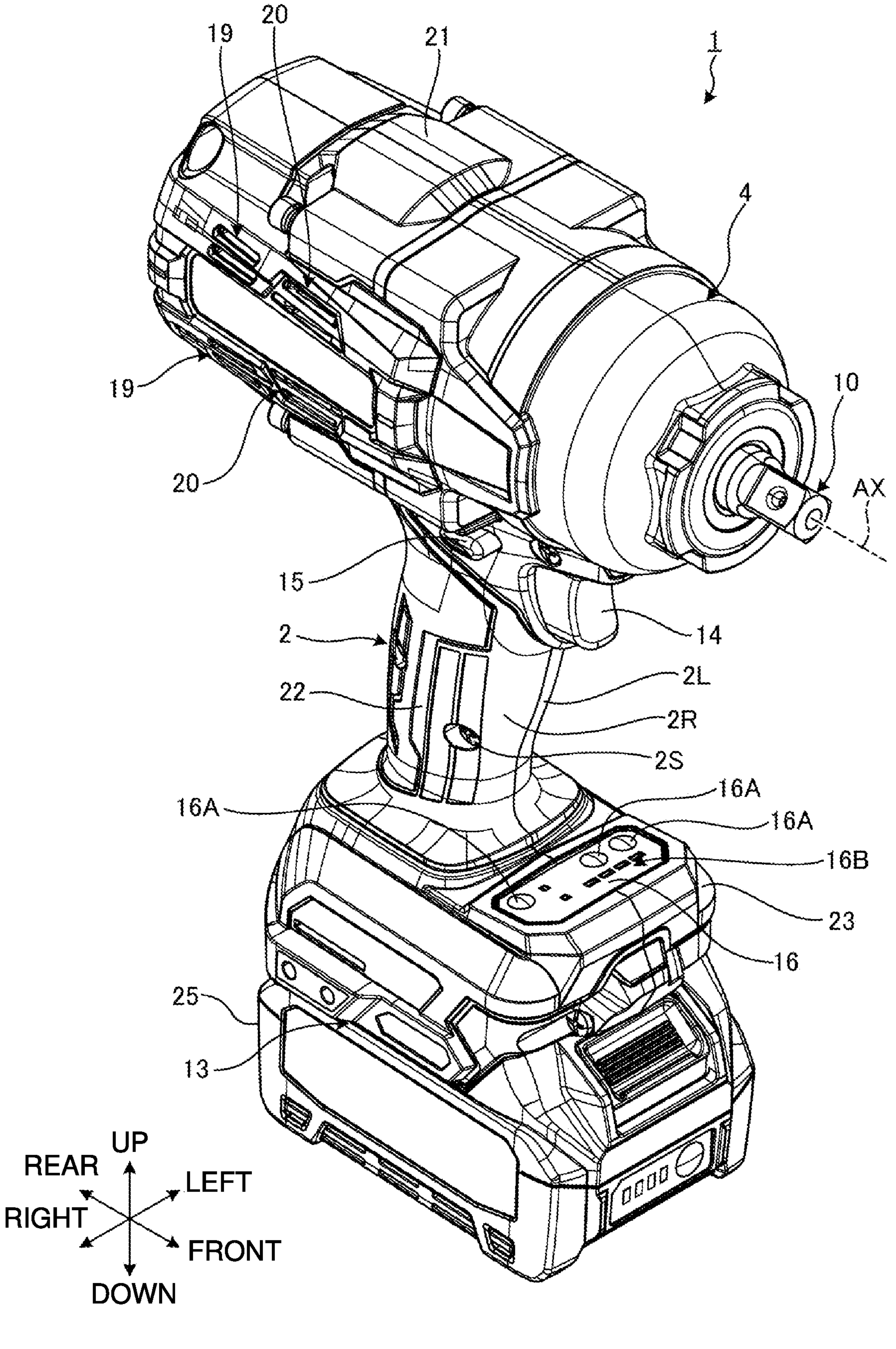
FIG. 1 is a perspective view of an impact tool according to a first embodiment as viewed from the front.
Figure 2:
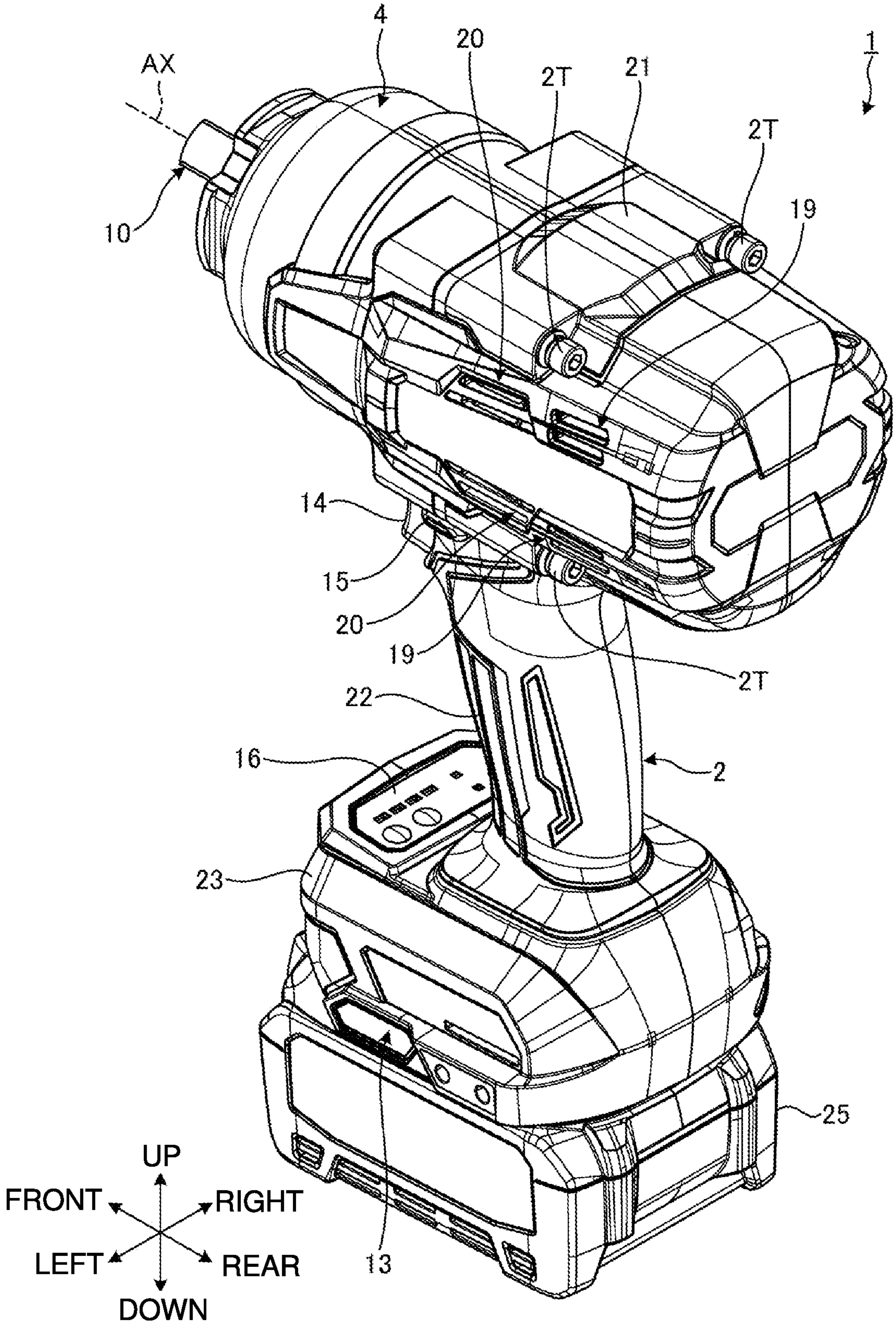
FIG. 2 is a perspective view of the impact tool according to the first embodiment as viewed from the rear.
Figure 3:
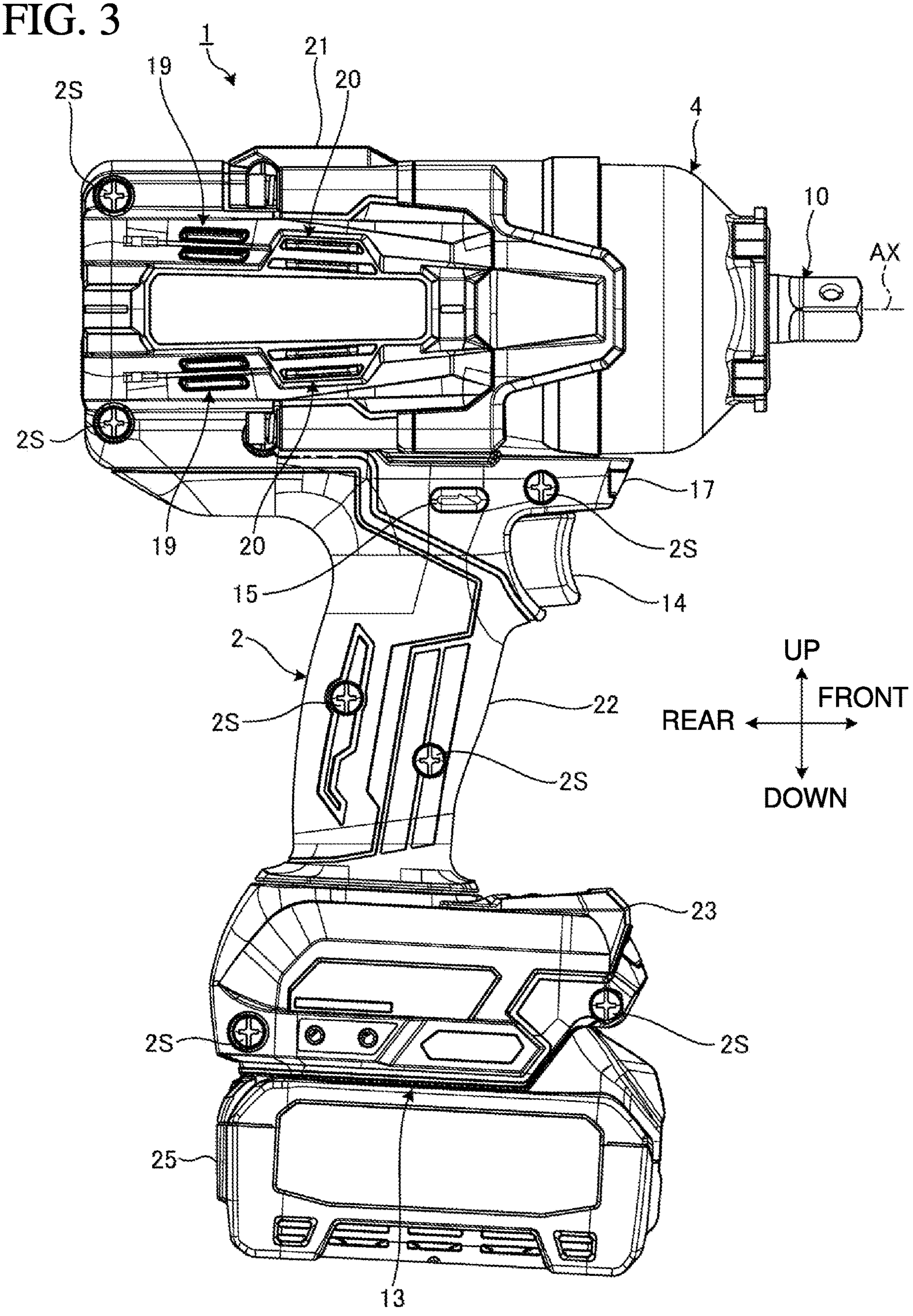
FIG. 3 is a side view of the impact tool according to the first embodiment.
Figure 4:
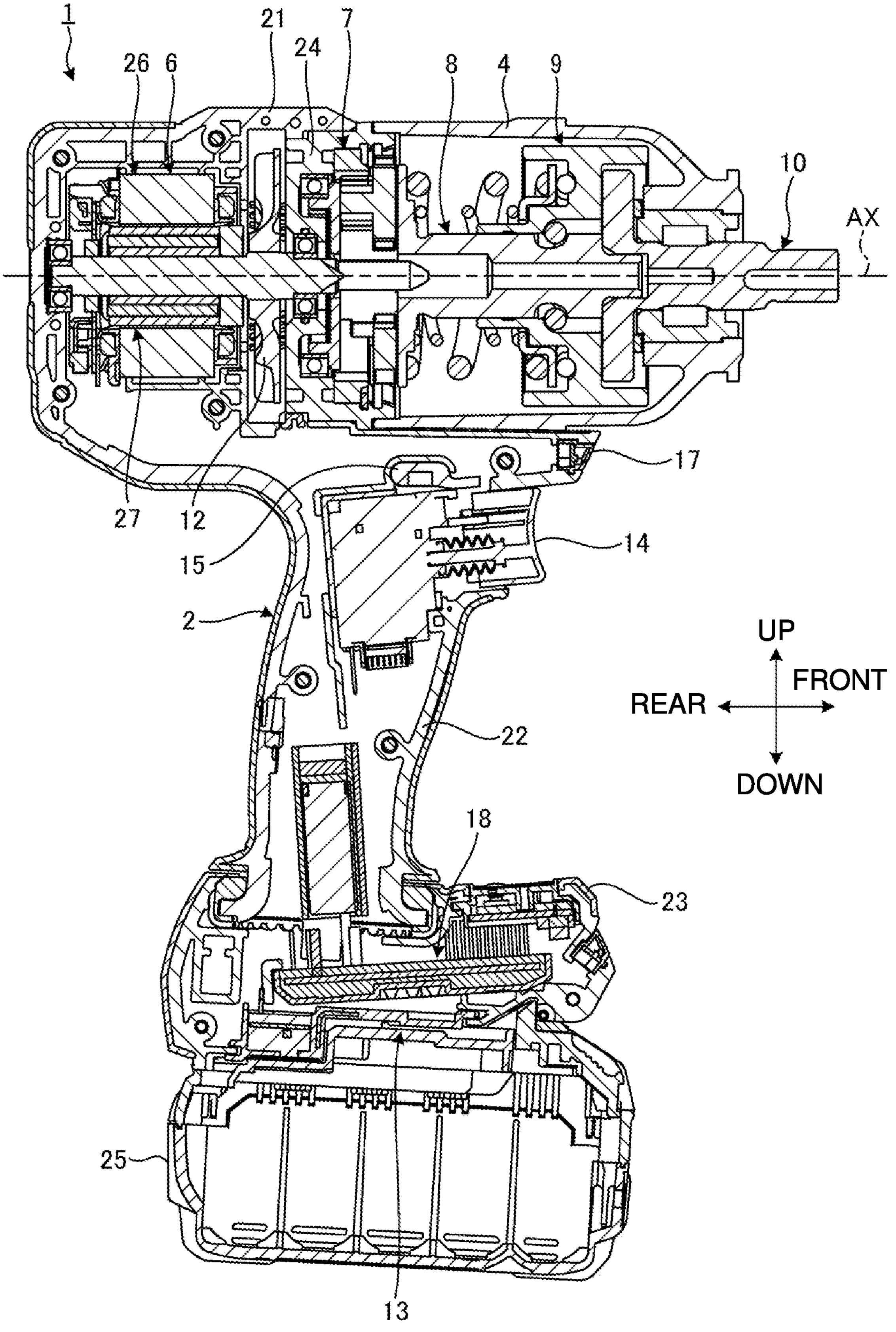
FIG. 4 is a longitudinal sectional view of the impact tool according to the first embodiment.

FIG. 1 is a perspective view of the impact tool 1 according to a first embodiment as viewed from the front. FIG. 2 is a perspective view of the impact tool 1 as viewed from the rear. FIG. 3 is a side view of the impact tool 1. FIG. 4 is a longitudinal sectional view of the impact tool 1.

The impact tool 1 according to the present embodiment is an impact wrench. The impact tool 1 includes a housing 2, a hammer case 4, the motor 6, a reducer 7, a spindle 8, a striker 9, an anvil 10, a fan 12, a battery mount 13, a trigger lever 14, a forward-reverse switch lever 15, an operation display 16, a light 17, and a controller 18.

The housing 2 is formed from a synthetic resin. The housing 2 in the present embodiment is formed from nylon. The housing 2 includes a left housing 2L and a right housing 2R. The right housing 2R is located on the right of the left housing 2L. The left housing 2L and the right housing 2R are fastened together with multiple screws 2S. The housing 2 includes a pair of housing halves.

The housing 2 includes a motor compartment 21, a grip 22, and a battery holder 23.

The motor compartment 21 accommodates the motor 6. The motor compartment 21 and the hammer case 4 are fastened together with multiple screws 2T.

The grip 22 is grippable by an operator. The grip 22 extends downward from the motor compartment 21. The trigger lever 14 is located in an upper portion of the grip 22.

The battery holder 23 holds a battery pack 25 with the battery mount 13 in between. The battery holder 23 is connected to a lower end of the grip 22. The battery holder 23 has larger outer dimensions than the grip 22 in the front-rear and lateral directions.

The motor compartment 21 has inlets 19 and outlets 20. The outlets 20 are located frontward from the inlets 19. Air outside the housing 2 flows into an internal space of the housing 2 through the inlets 19, and then flows out of the housing 2 through the outlets 20.

The hammer case 4 accommodates at least parts of the reducer 7, the spindle 8, the striker 9, and the anvil 10. The reducer 7 is located at least partially inside a bearing box 24. The reducer 7 includes multiple gears.

The hammer case 4 is formed from a metal. The hammer case 4 in the present embodiment is formed from aluminum. The hammer case 4 is cylindrical. The hammer case 4 connects to a front portion of the motor compartment 21. The bearing box 24 is fixed to a rear portion of the hammer case 4. The bearing box 24 has threads on its outer periphery. The hammer case 4 has a threaded groove on its inner periphery. The threads on the bearing box 24 are engaged with the threaded groove on the hammer case 4. The bearing box 24 and the hammer case 4 are thus fastened together.

The motor 6 is a power source for the impact tool 1. The motor 6 is a brushless inner-rotor motor. The motor 6 includes a stator 26 and a rotor 27. The stator 26 is supported on the motor compartment 21. The rotor 27 is located at least partially inward from the stator 26. The rotor 27 rotates relative to the stator 26. The rotor 27 rotates about the rotation axis AX extending in the front-rear direction.

The reducer 7 connects the rotor 27 and the spindle 8 together. The reducer 7 transmits rotation of the rotor 27 to the spindle 8. The reducer 7 rotates the spindle 8 at a lower rotational speed than the rotor 27. The reducer 7 is located frontward from the motor 6. The reducer 7 includes a planetary gear assembly. The reducer 7 includes multiple gears. The rotor 27 drives the gears in the reducer 7.

The spindle 8 rotates with a rotational force from the rotor 27 transmitted by the reducer 7. The spindle 8 is located frontward from at least a part of the motor 6. The spindle 8 is located frontward from the stator 26. The spindle 8 is located at least partially frontward from the rotor 27. The spindle 8 is located at least partially in front of the reducer 7. The spindle 8 is located behind the anvil 10.

The striker 9 strikes the anvil 10 in the rotation direction in response to the rotational force of the spindle 8 rotated by the motor 6. A rotational force from the motor 6 is transmitted to the striker 9 through the reducer 7 and the spindle 8.

The anvil 10 is an output shaft of the impact tool 1 that rotates in response to the rotational force of the rotor 27. The anvil 10 is located frontward from the motor 6. The anvil 10 receives a socket as one type of tip tool on its front end.

The fan 12 generates an airflow for cooling the motor 6. The fan 12 is located frontward from the stator 26 in the motor 6. The fan 12 is fixed to at least a part of the rotor 27. As the fan 12 rotates, air outside the housing 2 flows into the internal space of the housing 2 through the inlets 19 and flows through the internal space of the housing 2 to cool the motor 6. As the fan 12 rotates, the air passing through the housing 2 flows out of the housing 2 through the outlets 20.

The battery mount 13 is connected to the battery pack 25. The battery pack 25 is attached to the battery mount 13 in a detachable manner. The battery mount 13 is located in a lower portion of the battery holder 23. The battery pack 25 is inserted into the battery mount 13 from the front of the battery holder 23 and is thus attached to the battery mount 13. The battery pack 25 is pulled forward along the battery mount 13 and is thus detached from the battery mount 13. The battery pack 25 includes a secondary battery. The battery pack 25 in the embodiment includes a rechargeable lithium-ion battery. The battery pack 25 is attached to the battery mount 13 to power the impact tool 1. The motor 6 is driven by power supplied from the battery pack 25.

The trigger lever 14 is operable by the operator to activate the motor 6. The trigger lever 14 is operable to switch the motor 6 between the driving state and the stopped state. The trigger lever 14 is located on the grip 22.

The forward-reverse switch lever 15 is operable by the operator. The forward-reverse switch lever 15 is operable to switch the rotation direction of the motor 6 between forward and reverse. This operation switches the rotation direction of the spindle 8. The forward-reverse switch lever 15 is located above the grip 22.

The operation display 16 includes multiple operation buttons 16A and an indicator 16B. The operation buttons 16A are operable to change the operation mode of the motor 6. The indicator 16B includes multiple light emitters. The indicator 16B indicates the operation mode of the motor 6 by changing the lighting patterns of the multiple light emitters. The operation display 16 is located on the battery holder 23. The operation display 16 is located on the upper surface of the battery holder 23 frontward from the grip 22.

The light 17 emits illumination light. The light 17 illuminates the anvil 10 and an area around the anvil 10 with illumination light. The light 17 illuminates an area ahead of the anvil 10 with illumination light. The light 17 also illuminates a tip tool attached to the anvil 10 and an area around the tip tool with illumination light. The light 17 is located above the trigger lever 14.

The controller 18 outputs control signals for controlling the motor 6. The controller 18 includes a board on which multiple electronic components are mounted. Examples of the electronic components mounted on the board include a processor such as a central processing unit (CPU), a non-volatile memory such as a read-only memory (ROM) or a storage device, a volatile memory such as a random-access memory (RAM), a transistor, and a resistor. The controller 18 is accommodated in the battery holder 23.

Figure 5:
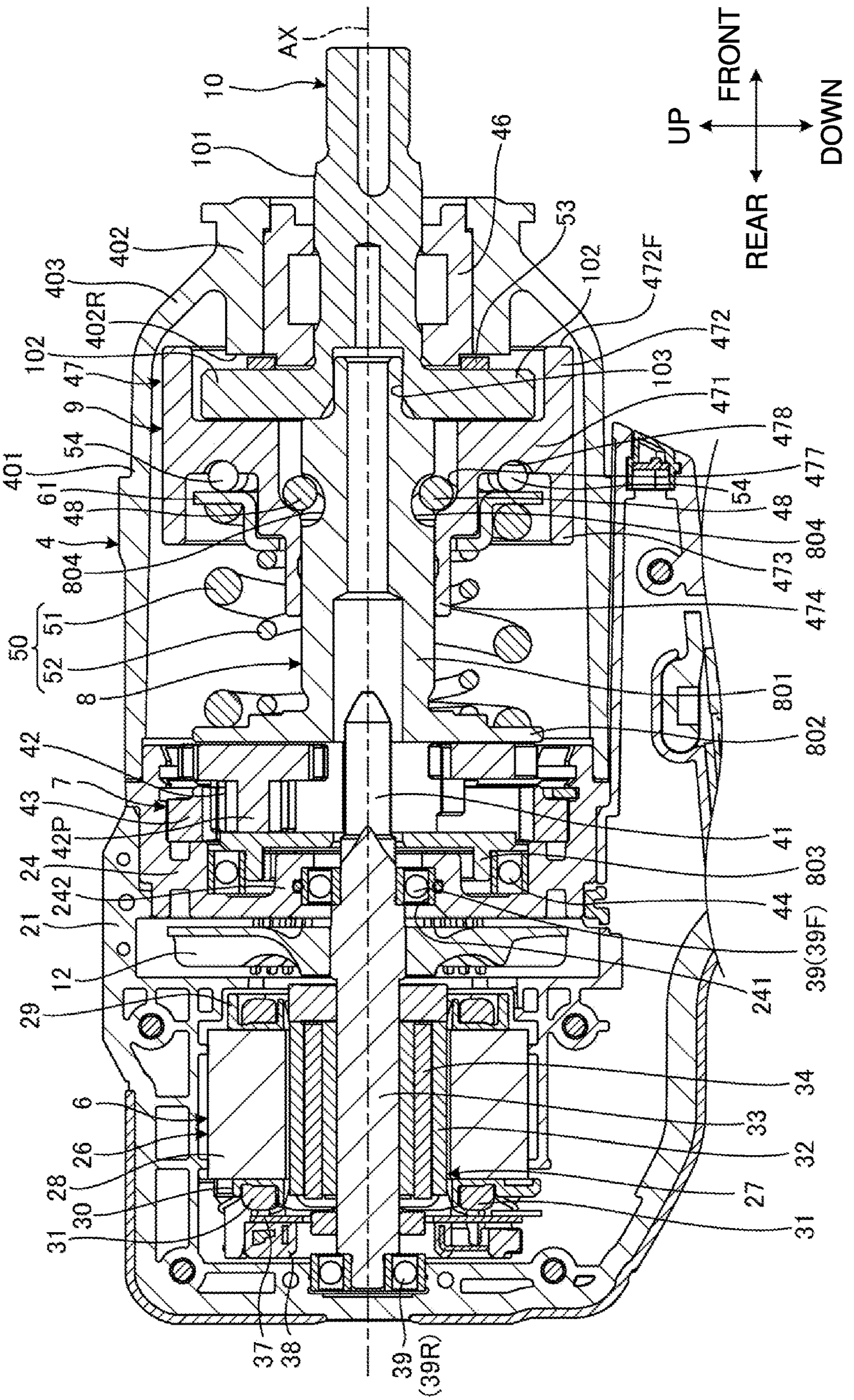
FIG. 5 is a longitudinal sectional view of an upper portion of the impact tool according to the first embodiment.
Figure 6:
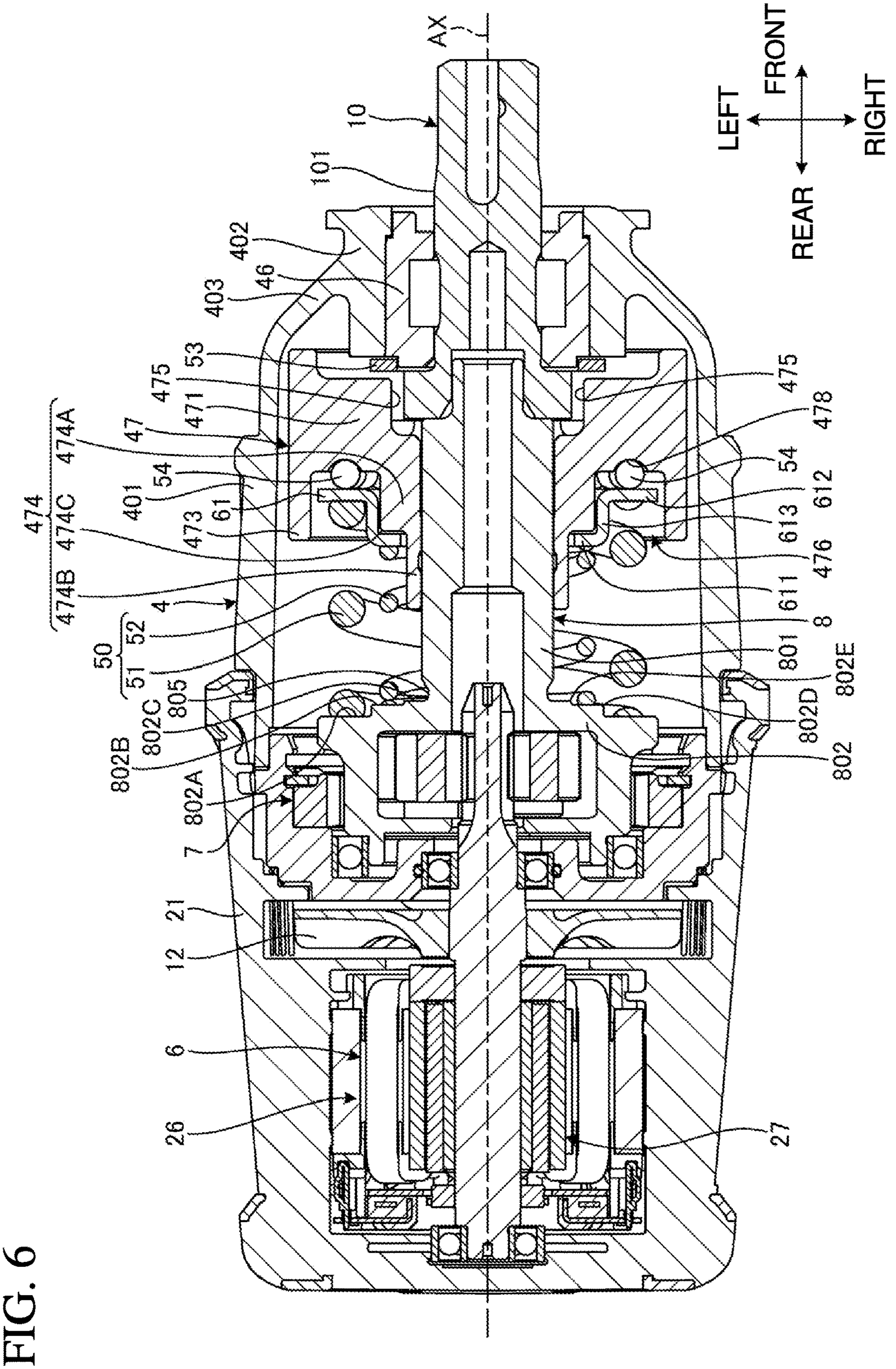
FIG. 6 is a horizontal sectional view of the upper portion of the impact tool according to the first embodiment.
Figure 7:
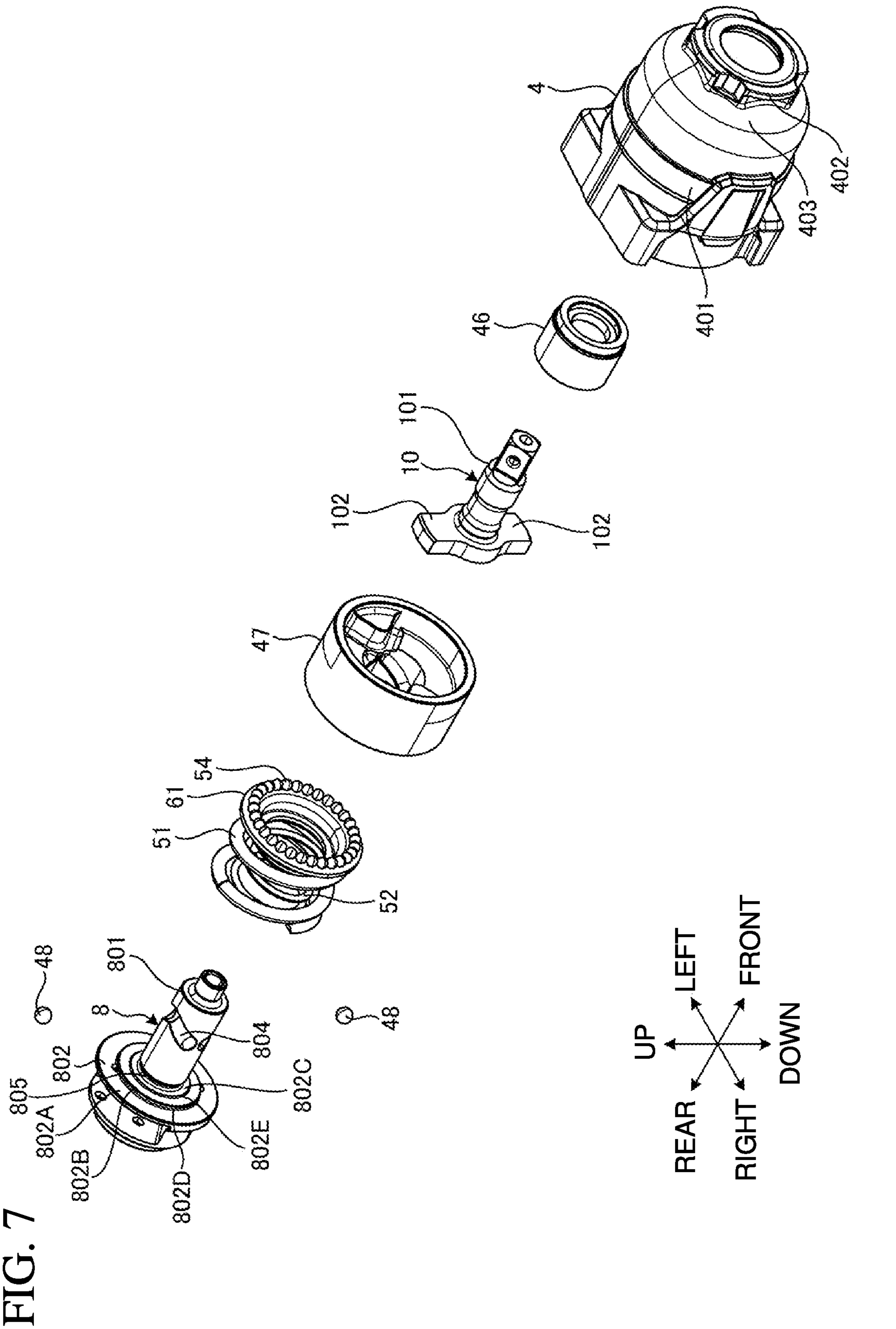
FIG. 7 is a partially exploded perspective view of the impact tool according to the first embodiment as viewed from the front.
Figure 8:
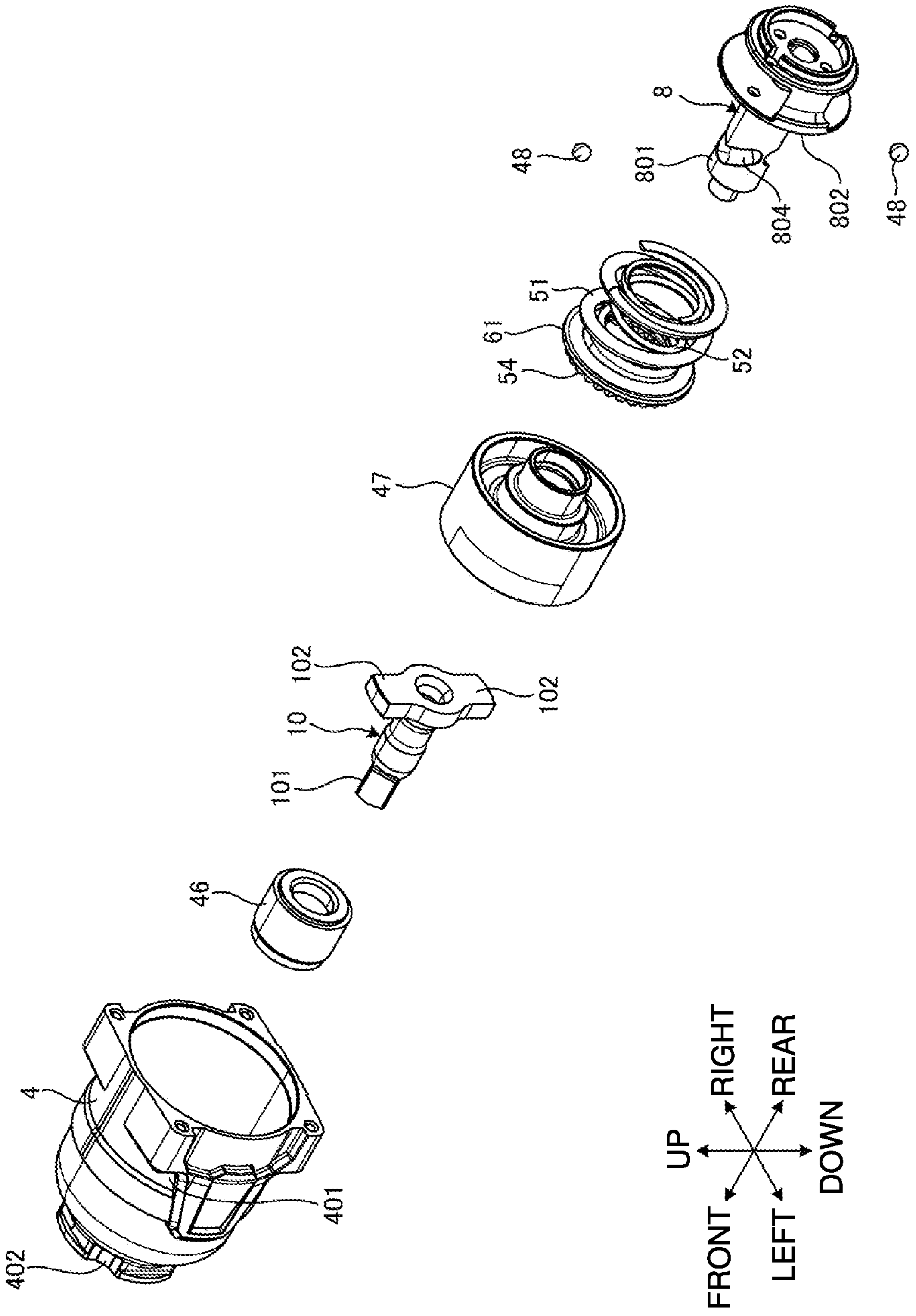
FIG. 8 is a partially exploded perspective view of the impact tool according to the first embodiment as viewed from the rear.

FIG. 5 is a longitudinal sectional view of an upper portion of the impact tool 1 according to the present embodiment. FIG. 6 is a horizontal sectional view of the upper portion of the impact tool 1. FIG. 7 is a partially exploded perspective view of the impact tool 1 as viewed from the front. FIG. 8 is a partially exploded perspective view of the impact tool 1 as viewed from the rear.

The hammer case 4 includes a first cylinder 401, a second cylinder 402, and a case connector 403. The first cylinder 401 surrounds the striker 9. The second cylinder 402 is located frontward from the first cylinder 401. The second cylinder 402 has a smaller outer diameter than the first cylinder 401. The case connector 403 connects the front end of the first cylinder 401 to the outer circumference surface of the second cylinder 402. The second cylinder 402 has a rear end protruding rearward from the case connector 403.

The motor 6 includes a stator 26 and a rotor 27. The stator 26 includes a stator core 28, a front insulator 29, a rear insulator 30, and coils 31. The rotor 27 rotates about the rotation axis AX. The rotor 27 includes a rotor core 32, a rotor shaft 33, and a rotor magnet 34.

The stator core 28 is located radially outside the rotor 27. The stator core 28 includes multiple steel plates stacked on one another. The steel plates are metal plates formed from iron as a main component. The stator core 28 is cylindrical. The stator core 28 has multiple teeth to support the coils 31.

The front insulator 29 is located on the front of the stator core 28. The rear insulator 30 is located at the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The stator 26 includes multiple coils 31. The coils 31 surround the teeth on the stator core 28 with the front insulator 29 and the rear insulator 30 in between. The coils 31 and the stator core 28 are electrically insulated from each other with the front insulator 29 and the rear insulator 30. The multiple coils 31 are connected to one another with a busbar unit 38.

The rotor core 32 and the rotor shaft 33 are formed from steel. The rotor shaft 33 is located inward from the rotor core 32. The rotor core 32 is fixed to the rotor shaft 33. The rotor shaft 33 has a front end protruding frontward from the front end face of the rotor core 32. The rotor shaft 33 has a rear end protruding rearward from the rear end face of the rotor core 32.

The rotor magnet 34 is fixed to the rotor core 32. The rotor magnet 34 is located inside the rotor core 32.

A sensor board 37 is attached to the rear insulator 30. The sensor board 37 includes a circuit board and a rotation detector. The circuit board is a disk with a hole at the center. The rotation detector is supported by the circuit board. The sensor board 37 at least partially faces the rotor magnet 34. The rotation detector detects the position of the rotor magnet 34 on the rotor 27 to detect the position of the rotor 27 in the rotation direction.

The rotor shaft 33 is rotatably supported by a rotor bearing 39. The rotor bearing 39 includes a front rotor bearing 39F and a rear rotor bearing 39R. The front rotor bearing 39F supports the front end of the rotor shaft 33 in a rotatable manner. The rear rotor bearing 39R supports the rear end of the rotor shaft 33 in a rotatable manner.

The front rotor bearing 39F is held by the bearing box 24. The bearing box 24 has a recess 241. The recess 241 is recessed frontward from the rear surface of the bearing box 24. The front rotor bearing 39F is received in the recess 241. The rear rotor bearing 39R is held by a rear portion of the motor compartment 21. The front end of the rotor shaft 33 is located inside the hammer case 4 through the opening in the bearing box 24.

The fan 12 is fixed to the front of the rotor shaft 33. The fan 12 is located between the front rotor bearing 39F and the stator 26. As the rotor shaft 33 rotates, the fan 12 rotates together with the rotor shaft 33.

A pinion gear 41 is located on the front end of the rotor shaft 33. The pinion gear 41 is connected to at least a part of the reducer 7. The rotor shaft 33 is connected to the reducer 7 with the pinion gear 41.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is fixed to the hammer case 4. The internal gear 43 is constantly nonrotatable relative to the hammer case 4.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, rotates at a lower rotational speed than the rotor shaft 33.

The spindle 8 rotates with a rotational force from the motor 6. The spindle 8 transmits the rotational force from the motor 6 to the anvil 10 through the striker 9. The spindle 8 includes a spindle shaft 801 and a flange 802. The flange 802 is located at the rear of the spindle shaft 801. The planetary gears 42 are rotatably supported by the flange 802 with the pin 42P. The rotation axis of the spindle 8 aligns with the rotation axis AX of the motor 6. The spindle 8 rotates about the rotation axis AX. The spindle 8 is rotatably supported by a spindle bearing 44. The spindle 8 includes a protrusion 803 on its rear end. The protrusion 803 protrudes rearward from the flange 802. The protrusion 803 surrounds the spindle bearing 44.

The bearing box 24 at least partially surrounds the spindle 8. The spindle bearing 44 is held by the bearing box 24. The bearing box 24 includes a protrusion 242. The protrusion 242 protrudes frontward from the front surface of the bearing box 24. The spindle bearing 44 surrounds the protrusion 242.

The striker 9 includes a hammer 47, hammer balls 48, a coil spring 50, and a cup washer 61. The striker 9 is accommodated in the first cylinder 401 in the hammer case 4. The first cylinder 401 surrounds the hammer 47.

The hammer 47 is located frontward from the reducer 7. The hammer 47 surrounds the spindle shaft 801. The hammer 47 is supported by the spindle shaft 801.

The hammer 47 is rotated by the motor 6. A rotational force from the motor 6 is transmitted to the hammer 47 through the reducer 7 and the spindle 8. The hammer 47 is rotatable together with the spindle 8 in response to the rotational force of the spindle 8. The rotation axis of the hammer 47 and the rotation axis of the spindle 8 align with the rotation axis AX of the motor 6. The hammer 47 rotates about the rotation axis AX.

Figure 11:
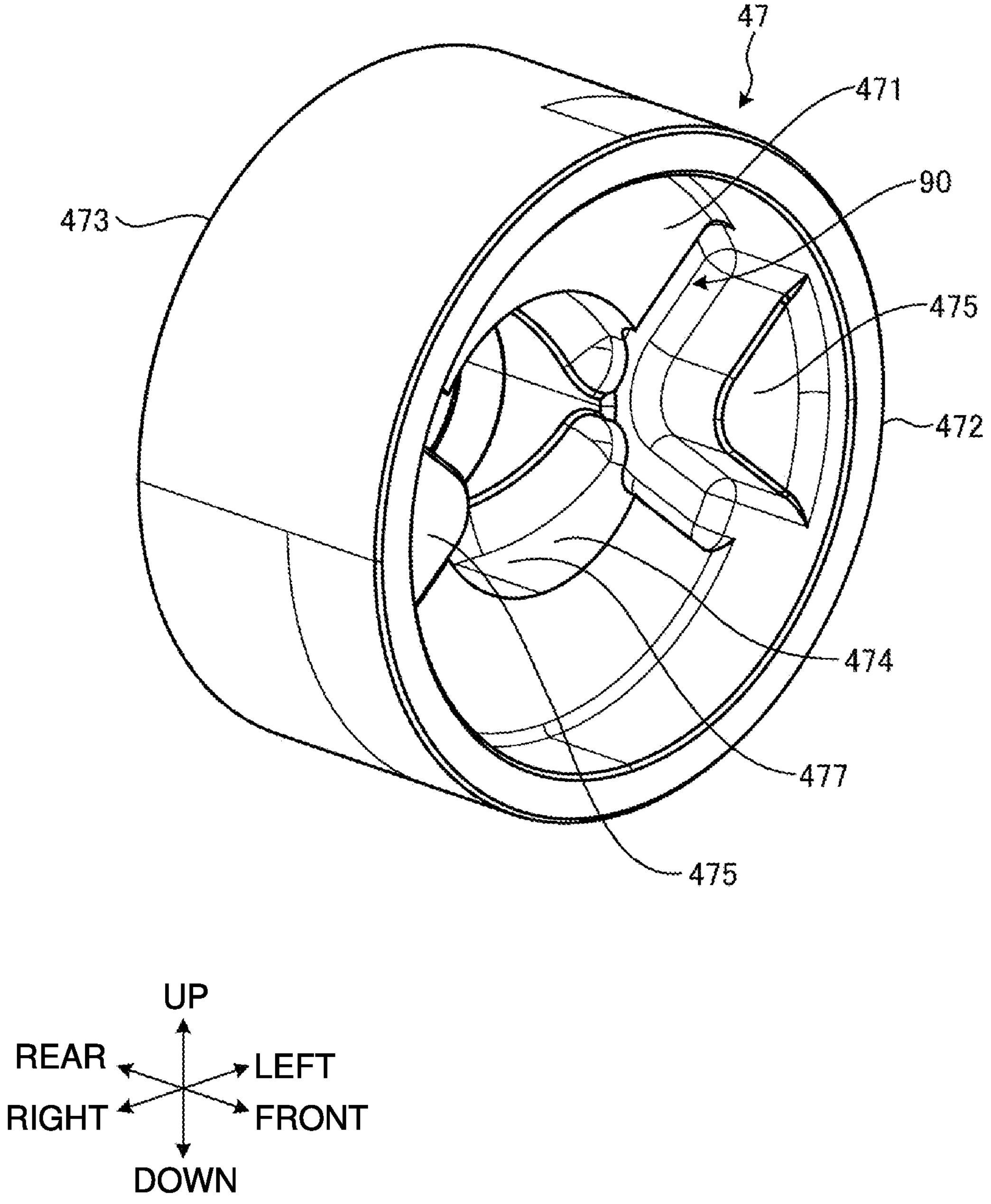
FIG. 11 is a perspective view of a hammer in the first embodiment as viewed from the front.
Figure 12:
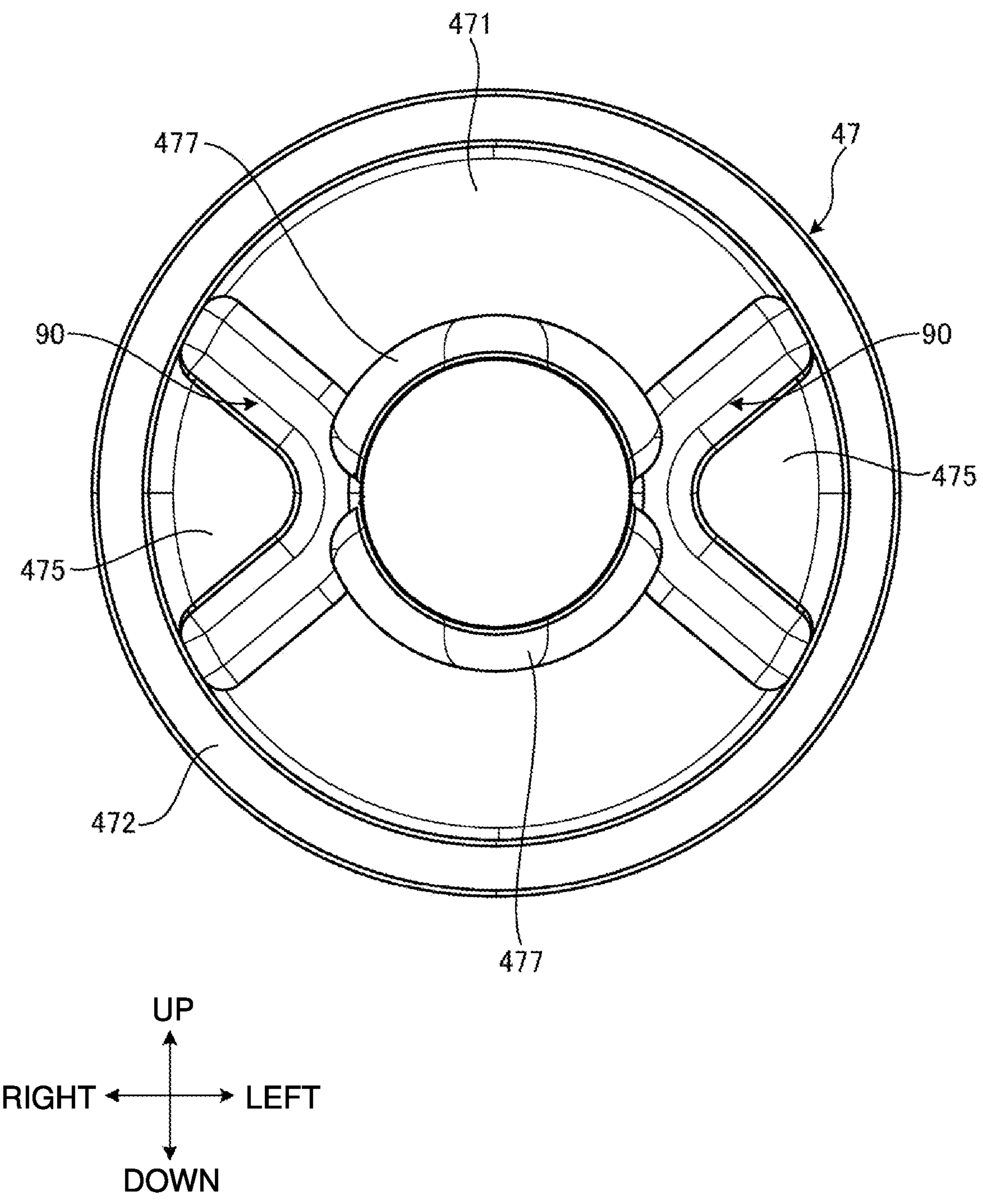
FIG. 12 is a front view of the hammer in the first embodiment.
Figure 13:
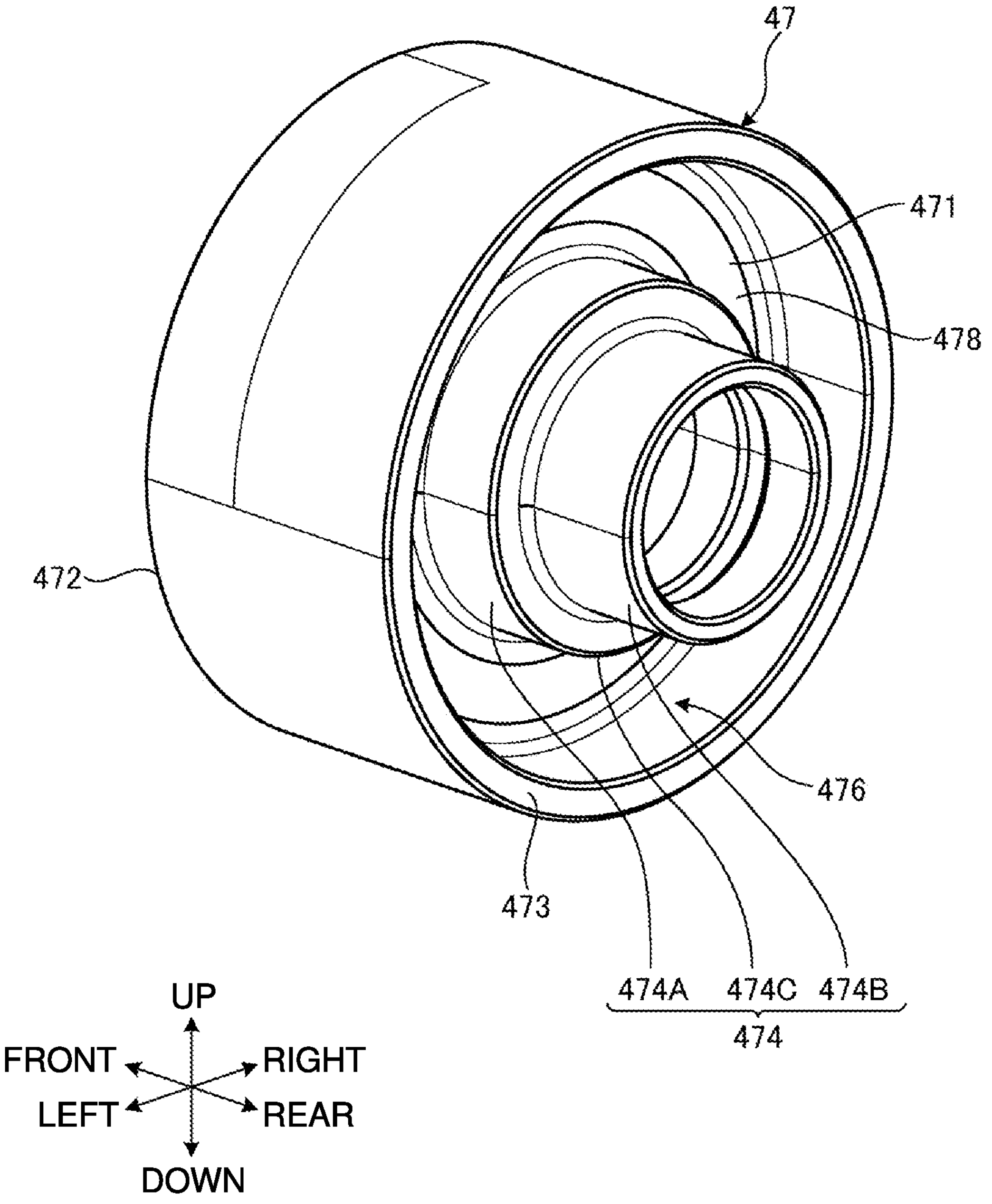
FIG. 13 is a perspective view of the hammer in the first embodiment as viewed from the rear.
Figure 14:
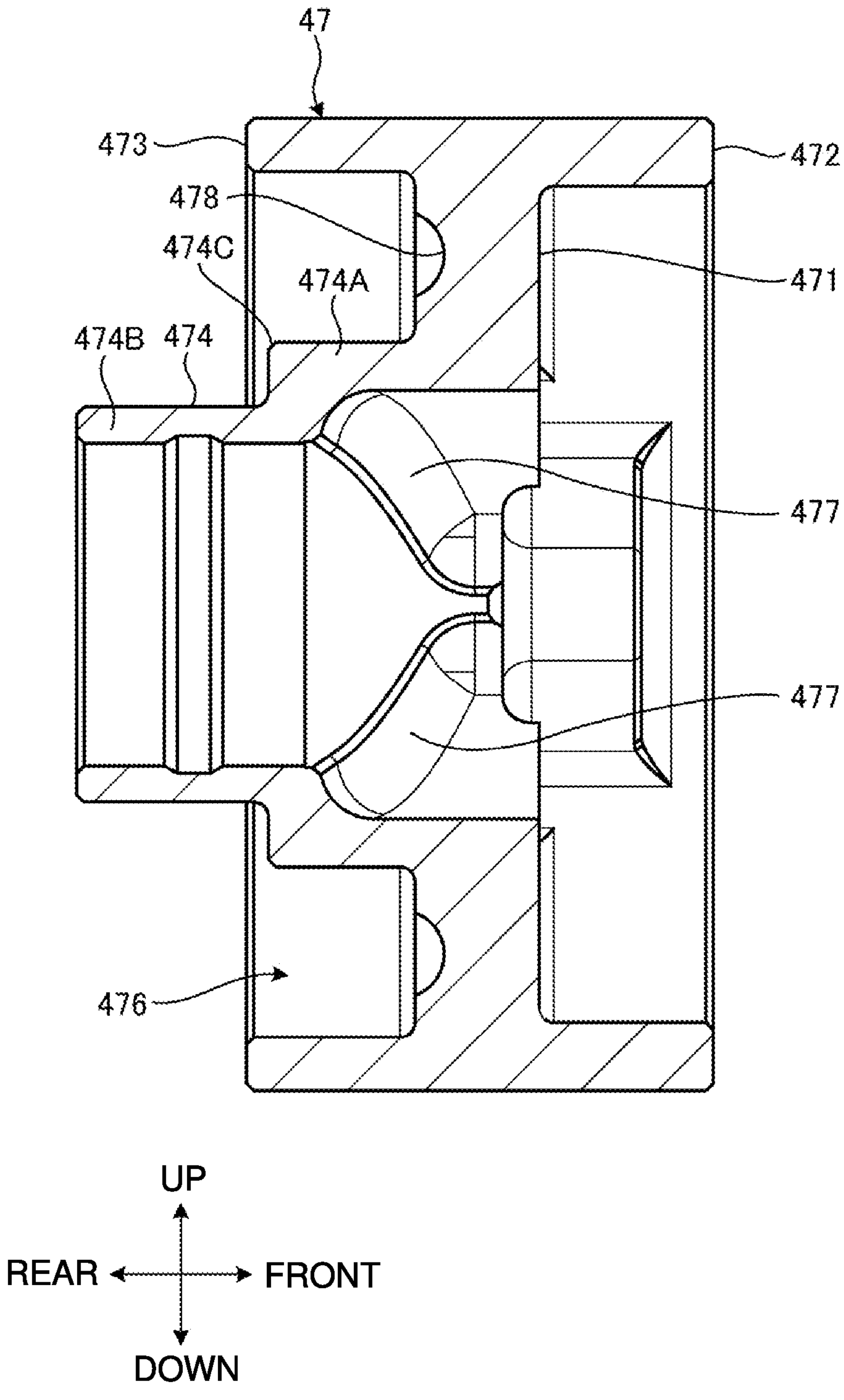
FIG. 14 is a longitudinal sectional view of the hammer in the first embodiment.

FIG. 11 is a perspective view of the hammer 47 in the present embodiment as viewed from the front. FIG. 12 is a front view of the hammer 47. FIG. 13 is a perspective view of the hammer 47 as viewed from the rear. FIG. 14 is a longitudinal sectional view of the hammer 47.

The hammer 47 includes a base 471, a front ring 472, a rear ring 473, a support ring 474, and hammer projections 475.

The base 471 surrounds the spindle shaft 801. The base 471 is annular. The spindle shaft 801 is located inward from the base 471.

The front ring 472 protrudes frontward from an outer circumference of the base 471. The front ring 472 is cylindrical.

The rear ring 473 protrudes rearward from the outer circumference of the base 471. The rear ring 473 is cylindrical.

The support ring 474 protrudes rearward from an inner circumference of the base 471. The support ring 474 is cylindrical. The support ring 474 surrounds the spindle shaft 801. The support ring 474 is supported by the spindle shaft 801 with the hammer balls 48 in between. The support ring 474 includes a larger-diameter portion 474A and a smaller-diameter portion 474B. The smaller-diameter portion 474B is located rearward from the larger-diameter portion 474A. The larger-diameter portion 474A has a larger outer diameter than the smaller-diameter portion 474B. A step 474C is located at the boundary between the larger-diameter portion 474A and the smaller-diameter portion 474B.

The rear ring 473 has a rear end located frontward from the rear end of the support ring 474. The rear ring 473 has an inner diameter larger than the outer diameter of the flange 802.

The hammer projections 475 protrude radially inward from an inner circumferential surface of the front ring 472. The hammer projections 475 protrude frontward from the front surface of the base 471. The front surfaces of the hammer projections 475 are located frontward from the front surface of the base 471. The front surface of the front ring 472 and the front surfaces of the hammer projections 475 are flush with one another. The hammer projections 475 are two hammer projections arranged circumferentially.

The rear surface of the base 471, the inner circumferential surface of the rear ring 473, and the outer circumference surface of the support ring 474 define a recess 476. The recess 476 is located at the rear of the hammer 47. The recess 476 is recessed frontward from the rear surface of the hammer 47.

The base 471 has grooves 90 at the boundaries with the hammer projections 475. The grooves 90 extend in the radial direction. The grooves 90 are located in a first circumferential direction and a second circumferential direction of the hammer projections 475.

The hammer balls 48 are formed from a metal such as steel. The hammer balls 48 are between the spindle shaft 801 and the hammer 47. The spindle 8 has a spindle groove 804 to receive at least parts of the hammer balls 48. The spindle groove 804 is on the outer circumference surface of the spindle shaft 801. The hammer 47 has a hammer groove 477 to receive at least parts of the hammer balls 48. The hammer groove 477 is partially formed on the inner circumferential surface of the support ring 474. The hammer balls 48 are between the spindle groove 804 and the hammer groove 477. The hammer balls 48 roll inside the spindle groove 804 and inside the hammer groove 477. The hammer 47 is movable together with the hammer balls 48. The spindle 8 and the hammer 47 are movable relative to each other in the axial direction and in the rotation direction within a movable range defined by the spindle groove 804 and the hammer groove 477.

The coil spring 50 surrounds the spindle shaft 801. The coil spring 50 in the present embodiment includes a first coil spring 51 and a second coil spring 52 arranged parallel to each other. The second coil spring 52 is located radially inward from the first coil spring 51. The first coil spring 51 in the present embodiment has a greater spring constant than the second coil spring 52. The first coil spring 51 has a larger wire diameter than the second coil spring 52.

The rear end of the first coil spring 51 and the rear end of the second coil spring 52 are supported on the front surface of the flange 802. As shown in FIGS. 6 and 7, the flange 802 has a front surface including a first annular surface 802A, a second annular surface 802B, and a third annular surface 802C. The second annular surface 802B is located radially inward from the first annular surface 802A. The third annular surface 802C is located radially inward from the second annular surface 802B. The third annular surface 802C is located frontward from the second annular surface 802B. The second annular surface 802B is located frontward from the first annular surface 802A. A step 802D is located at the boundary between the first annular surface 802A and the second annular surface 802B. A step 802E is located at the boundary between the second annular surface 802B and the third annular surface 802C. The rear end of the first coil spring 51 is supported by the first annular surface 802A. The rear end of the second coil spring 52 is supported by the second annular surface 802B. The step 802D positions the rear end of the first coil spring 51 in the radial direction. The step 802E positions the rear end of the second coil spring 52 in the radial direction.

A recess 805 is located at the boundary between the inner circumference of the third annular surface 802C and the outer circumference surface of the spindle shaft 801. The recess 805 surrounds the rotation axis AX.

The first coil spring 51 and the second coil spring 52 have their front ends received in the recess 476. The cup washer 61 is located in the recess 476. The first coil spring 51 and the second coil spring 52 have their front ends supported by the cup washer 61. The cup washer 61 is annular. The first coil spring 51 and the second coil spring 52 each constantly generate an elastic force for moving the hammer 47 forward.

The cup washer 61 is located behind the base 471. The cup washer 61 supports the front end of the first coil spring 51 and the front end of the second coil spring 52. The cup washer 61 is between the rear ring 473 and the support ring 474 in the radial direction. The cup washer 61 is located in the recess 476. The cup washer 61 is supported by the hammer 47 with multiple support balls 54 in between. With the hammer 47 at the frontmost position in its movable range in the front-rear direction, the support balls 54 are located frontward from the rear ends of the hammer balls 48.

The support balls 54 are received in a support groove 478 inside the recess 476 on the hammer 47. In the present embodiment, the support groove 478 is located on the rear surface of the base 471. The support groove 478 is annular and surrounds the rotation axis AX. The support balls 54 support the cup washer 61.

Figure 9:
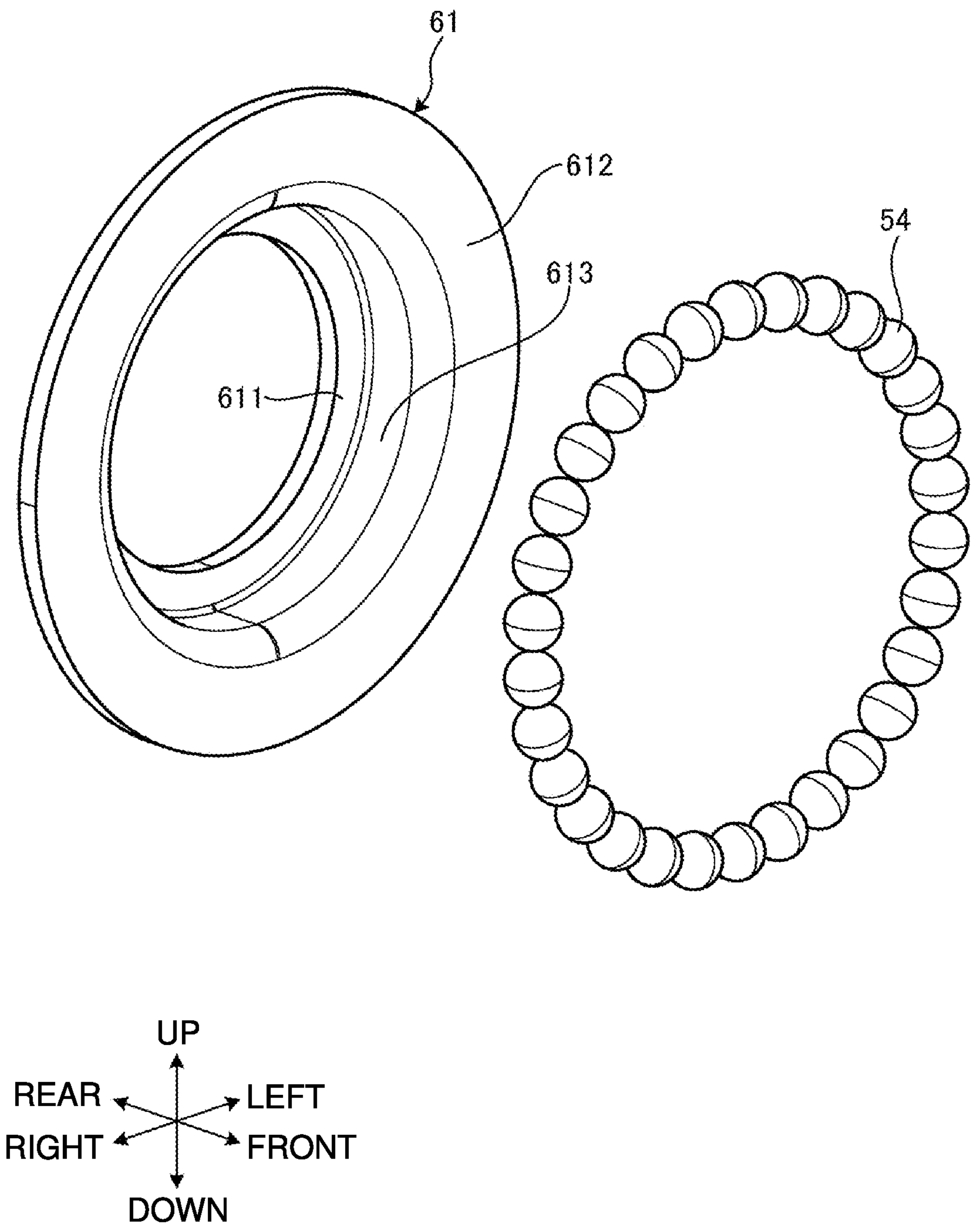
FIG. 9 is a perspective view of a cup washer and support balls in the first embodiment as viewed from the front.
Figure 10:
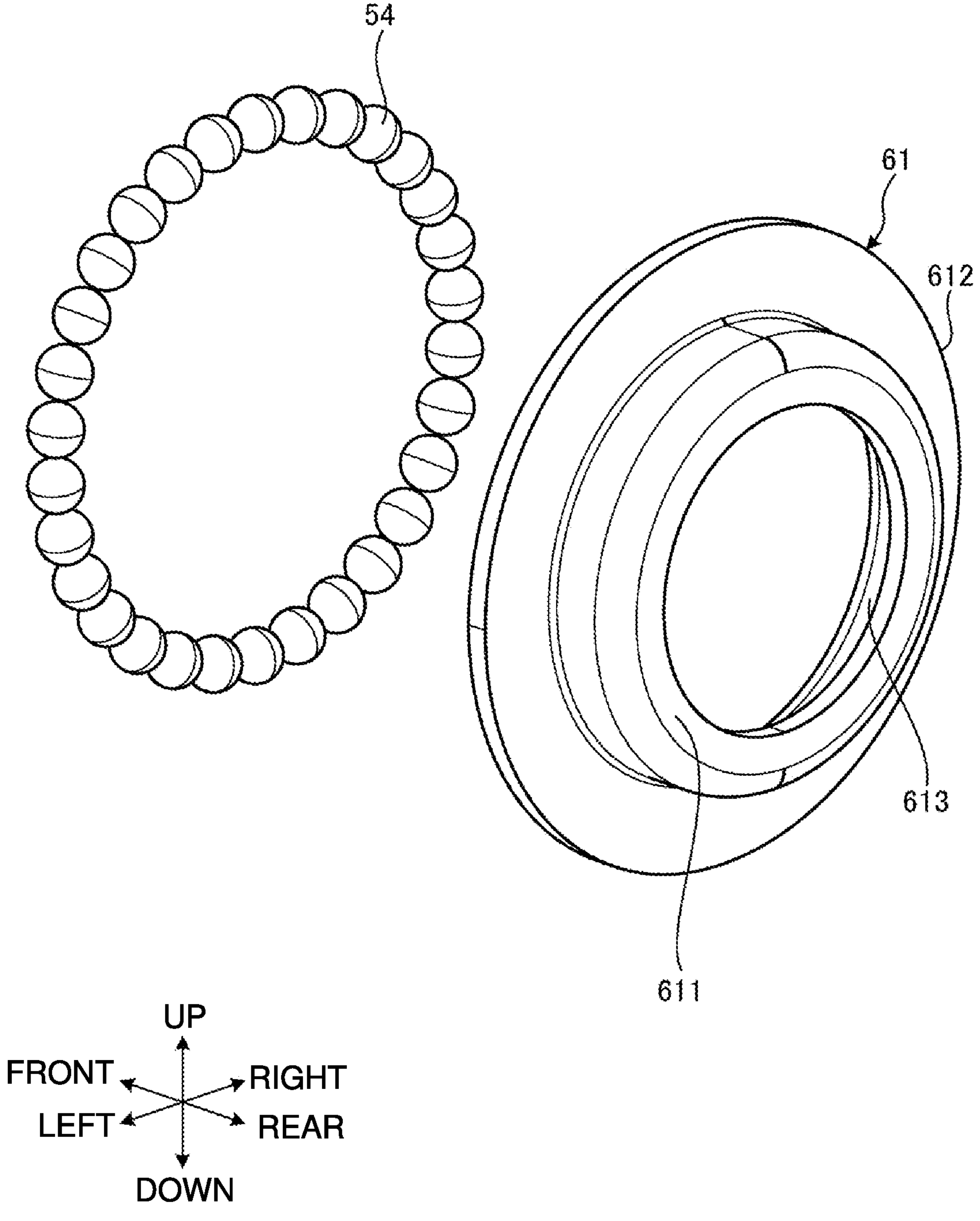
FIG. 10 is a perspective view of the cup washer and the support balls in the first embodiment as viewed from the rear.

FIG. 9 is a perspective view of the cup washer 61 and the support balls 54 in the present embodiment as viewed from the front. FIG. 10 is a perspective view of the cup washer 61 and the support balls 54 as viewed from the rear.

The cup washer 61 includes an inner ring 611, an outer ring 612, and a connecting ring 613.

The front end of the second coil spring 52 is supported by the inner ring 611. The front end of the second coil spring 52 is in contact with the rear surface of the inner ring 611. The inner ring 611 surrounds the smaller-diameter portion 474B. The front surface of the inner ring 611 faces the rear surface of the larger-diameter portion 474A.

The front end of the first coil spring 51 is supported by the outer ring 612. The front end of the first coil spring 51 is in contact with the rear surface of the outer ring 612. The outer ring 612 is located radially outward and frontward from the inner ring 611. The outer ring 612 is between the rear ring 473 and the larger-diameter portion 474A in the radial direction. The outer ring 612 protrudes radially outward from the larger-diameter portion 474A.

The connecting ring 613 connects an outer edge of the inner ring 611 and an inner edge of the outer ring 612. The connecting ring 613 surrounds the larger-diameter portion 474A. The inner circumferential surface of the connecting ring 613 and the outer circumference surface of the larger-diameter portion 474A face each other. The boundary between the connecting ring 613 and the outer ring 612 bends along the step 474C.

The multiple support balls 54 are arranged circumferentially. The support balls 54 are in contact with the front surface of the outer ring 612.

The cup washer 61 is held between the coil spring 50 and the support balls 54 in the front-rear direction. The cup washer 61 is spaced from the hammer 47 and the spindle 8.

The anvil 10 includes an anvil shaft 101 and anvil projections 102.

The anvil shaft 101 is located frontward from the spindle 8 and the hammer 47. The anvil shaft 101 receives a socket as one type of tip tool on its front end.

The anvil projections 102 protrude radially outward from the rear end of the anvil shaft 101. The anvil projections 102 are struck by the hammer projections 475 in the rotation direction. The washer 53 is between the front surfaces of the anvil projections 102 and a rear end 402R of the second cylinder 402. The washer 53 reduces contact between the anvil projections 102 and the second cylinder 402. The rear end of the second cylinder 402 receives an urging force from the anvil projections 102 through the washer 53.

The front ring 472 is located radially outward from the anvil projections 102. The front ring 472 is at the same position as at least parts of the anvil projections 102 in the axial direction. The outer circumference of each anvil projection 102 is spaced from the inner circumference of the front ring 472.

The front ring 472 has a front end 472F frontward from the rear end 402R of the second cylinder 402. In other words, a front portion of the front ring 472 and a rear portion of the second cylinder 402 overlap each other in the axial direction. This increases an inertial force from the hammer 47 that is rotating. This structure shortens the axial length, or the distance between the rear end of housing 2 and the front end of the anvil 10 in the axial direction.

The base 471 is located rearward from the anvil projections 102. The rear surfaces of the anvil projections 102 are spaced from the front surface of the base 471.

The anvil 10 is rotatably supported by an anvil bearing 46. The rotation axis of the anvil 10, the rotation axis of the hammer 47, and the rotation axis of the spindle 8 align with the rotation axis AX of the motor 6. The anvil 10 rotates about the rotation axis AX. The anvil bearing 46 surrounds the anvil shaft 101. The anvil bearing 46 is located inside the second cylinder 402 in the hammer case 4. The anvil bearing 46 is held by the second cylinder 402 in the hammer case 4. The anvil bearing 46 supports a front portion of the anvil shaft 101 in a rotatable manner.

The hammer projections 475 can come in contact with the anvil projections 102. When the motor 6 operates, with the hammer 47 and the anvil projections 102 in contact with each other, the anvil 10 rotates together with the hammer 47 and the spindle 8.

The anvil 10 is struck by the hammer 47 in the rotation direction. When, for example, the anvil 10 receives a higher load in an operation for tightening a bolt, the anvil 10 cannot rotate with an urging force from the coil spring 50 alone. This stops the rotation of the anvil 10 and the hammer 47. The spindle 8 and the hammer 47 are movable relative to each other in the axial direction and in the circumferential direction with the hammer balls 48 in between. Although the hammer 47 stops rotating, the spindle 8 continues to rotate with power generated by the motor 6. When the hammer 47 stops rotating and the spindle 8 rotates, the hammer balls 48 move backward as being guided along the spindle groove 804 and the hammer groove 477. The hammer 47 receives a force from the hammer balls 48 to move backward with the hammer balls 48. In other words, the hammer 47 moves backward when the anvil 10 stops rotating and the spindle 8 rotates. Thus, the hammer 47 and the anvil projections 102 are out of contact from each other.

When moving backward, the hammer 47 rotates relative to the spindle shaft 801. The cup washer 61 is spaced from the hammer 47 and the spindle 8. The rotation of the hammer 47 is thus not restricted by the cup washer 61. The support balls 54 are between the cup washer 61 and the hammer 47. The support balls 54 rotate to allow the hammer 47 to rotate smoothly.

The coil spring 50 constantly generates an elastic force for moving the hammer 47 forward. The hammer 47 moving backward then moves forward under an elastic force from the coil spring 50. The hammer 47 then receives a force in the rotation direction from the hammer balls 48. In other words, the hammer 47 moves forward while rotating. The hammer projections 475 then come in contact with the anvil projections 102 while rotating. Thus, the anvil projections 102 are struck by the hammer projections 475 in the rotation direction. The anvil 10 receives power from the motor 6 and an inertial force from the hammer 47. The anvil 10 thus rotates with high torque about the rotation axis AX.

Operation of Impact Tool

The operation of the impact tool 1 will now be described. For example, in an operation for tightening a bolt on a workpiece, the operator grips the grip 22 with, for example, the right hand, and pulls the trigger lever 14 with the right index finger. Power is then supplied from the battery pack 25 to the motor 6 to activate the motor 6 and turn on the light 17 at the same time. As the motor 6 is activated, the rotor shaft 33 rotates. A rotational force of the rotor shaft 33 is then transmitted to the planetary gears 42 through the pinion gear 41. The planetary gears 42 revolve about the pinion gear 41 while rotating and meshing with the internal teeth on the internal gear 43. The planetary gears 42 are rotatably supported by the spindle 8 with the pin 42P. The revolving planetary gears 42 rotate the spindle 8 at a lower rotational speed than the rotor shaft 33.

When the spindle 8 rotates, with the hammer projections 475 and the anvil projections 102 in contact with each other, the anvil 10 rotates together with the hammer 47 and the spindle 8. Thus, the bolt fastening operation proceeds.

When the anvil 10 receives a predetermined or higher load as the bolt fastening operation proceeds, the anvil 10 and the hammer 47 stop rotating. When the spindle 8 rotates in this state, the hammer 47 moves backward. Thus, the hammer projections 475 and the anvil projections 102 are out of contact from each other.

When moving backward, the hammer 47 rotates relative to the spindle shaft 801. The cup washer 61 is spaced from the hammer 47 and the spindle 8. The rotation of the hammer 47 is thus not restricted by the cup washer 61. The support balls 54 are between the cup washer 61 and the hammer 47. The support balls 54 rotate to allow the hammer 47 to rotate smoothly.

The hammer 47 moving backward then moves forward while rotating under elastic forces from the first coil spring 51 and the second coil spring 52. Thus, the anvil projections 102 are struck by the hammer projections 475 in the rotation direction. The anvil 10 thus rotates about the rotation axis AX at high torque. The screw is thus fastened to the workpiece under high torque.

The impact tool 1 according to the present embodiment includes the motor 6, the spindle 8, the anvil 10, the hammer 47, the first coil spring 51 and the second coil spring 52, the cup washer 61, and the support balls 54. The spindle 8 is rotatable with a rotational force from the motor 6 and includes the spindle shaft 801, and the flange 802 at the rear of the spindle shaft 801. The anvil 10 includes the anvil shaft 101 located frontward from the spindle 8 to receive a tip tool, and the anvil projections 102 protruding radially outward from the anvil shaft 101. The hammer 47 is supported by the spindle shaft 801 and includes the hammer projections 475 to strike the anvil projections 102 in the rotation direction, the recess 476 at the rear of the hammer 47, and the support groove 478 inside the recess 476. The first coil spring 51 and the second coil spring 52 surround the spindle shaft 801. The cup washer 61 is located in the recess 476 and supports the front end of the first coil spring 51 and the front end of the second coil spring 52. The support balls 54 are located in the support groove 478 and supports the cup washer 61.

The above structure includes the cup washer 61 supporting the front end of the first coil spring 51 and the front end of the second coil spring 52. The impact tool 1 thus has less size increase in the axial direction parallel to the rotation axis AX of the motor 6. The cup washer 61 is supported by the support balls 54. Thus, when the spindle shaft 801 and the hammer 47 rotate relative to each other, the support balls 54 rotate to allow the hammer 47 to rotate smoothly, thus improving the striking efficiency. The single cup washer 61 supports the front end of the first coil spring 51 and the front end of the second coil spring 52. This structure includes the single support groove 478. The impact tool 1 thus has less size increase in the axial direction.

The cup washer 61 in the present embodiment may be spaced from the hammer 47 and the spindle 8.

The rotation of the hammer 47 is thus not restricted by the cup washer 61, allowing the hammer 47 to rotate smoothly.

The cup washer 61 in the present embodiment may include the inner ring 611 supporting the front end of the second coil spring 52, the outer ring 612 located radially outward and frontward from the inner ring 611 and supporting the front end of the first coil spring 51, and the connecting ring 613 connecting the outer edge of the inner ring 611 and the inner edge of the outer ring 612.

This allows the cup washer 61 to support both the first coil spring 51 with a longer overall length and the second coil spring 52 with a shorter overall length, thus allowing the impact tool 1 to have less size increase in the axial direction.

The support balls 54 in the present embodiment may be in contact with the front surface of the outer ring 612.

This allows the outer ring 612 to be supported by the support balls 54 and the hammer 47 to rotate smoothly.

The hammer 47 in the present embodiment may include the base 471 surrounding the spindle shaft 801, the front ring 472 protruding frontward from the outer circumference of the base 471, the rear ring 473 protruding rearward from the outer circumference of the base 471, the support ring 474 protruding rearward from the inner circumference of the base 471 and supported by the spindle shaft 801 with the hammer balls 48 in between, and the hammer projections 475 protruding radially inward from the inner circumferential surface of the front ring 472 to strike the anvil projections 102 in the rotation direction. The recess 476 may include the rear surface of the base 471, the inner circumferential surface of the rear ring 473, and the outer circumferential surface of the support ring 474.

The impact tool 1 thus has less size increase in the axial direction.

The support groove 478 in the present embodiment may be located on the rear surface of the base 471.

The impact tool 1 thus has less size increase in the axial direction.

The support balls 54 in the present embodiment may be located frontward from the rear end of the hammer balls 48.

The impact tool 1 thus has less size increase in the axial direction.

In the present embodiment, the front ring 472 may be located radially outward from the anvil projections 102, and the front ring 472 may be at the same position as at least parts of the anvil projections 102 in the axial direction.

This increases the moment of inertia from the hammer 47 when the hammer projections 475 strike the anvil projections 102, thus increasing a striking force.

Modifications

In the present embodiment, the front end of the first coil spring 51 and the front end of the second coil spring 52 are supported by the cup washer 61. The front end of the first coil spring 51 and the front end of the second coil spring 52 may be supported by a member other than the cup washer 61, such as a member with a shape different from the shape of the cup washer 61.

Second Embodiment

A second embodiment will now be described. The same or corresponding components as those in the first embodiment are given the same reference numerals, and will be described briefly or will not be described.

Figure 15:
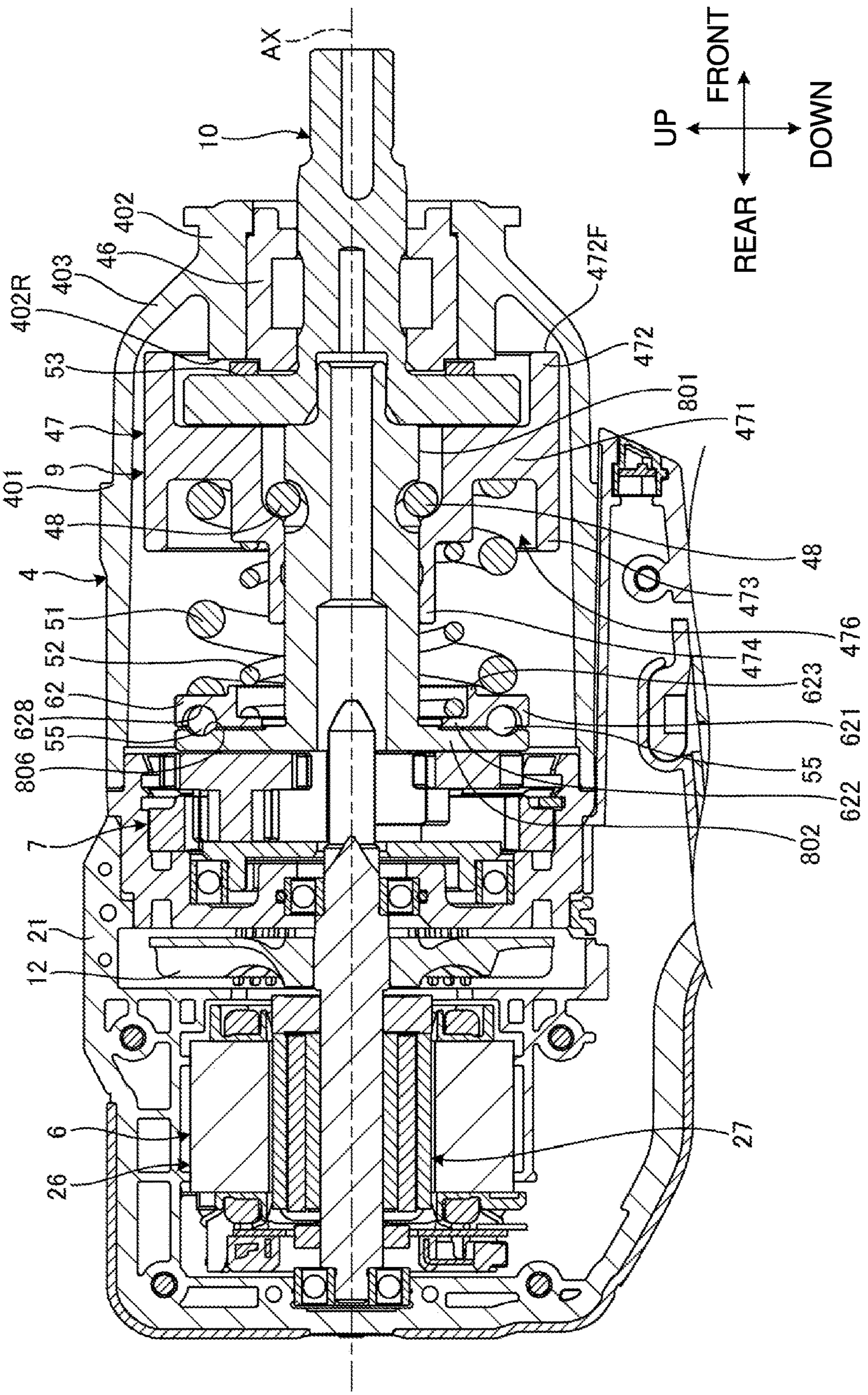
FIG. 15 is a longitudinal sectional view of an upper portion of an impact tool according to a second embodiment.
Figure 16:
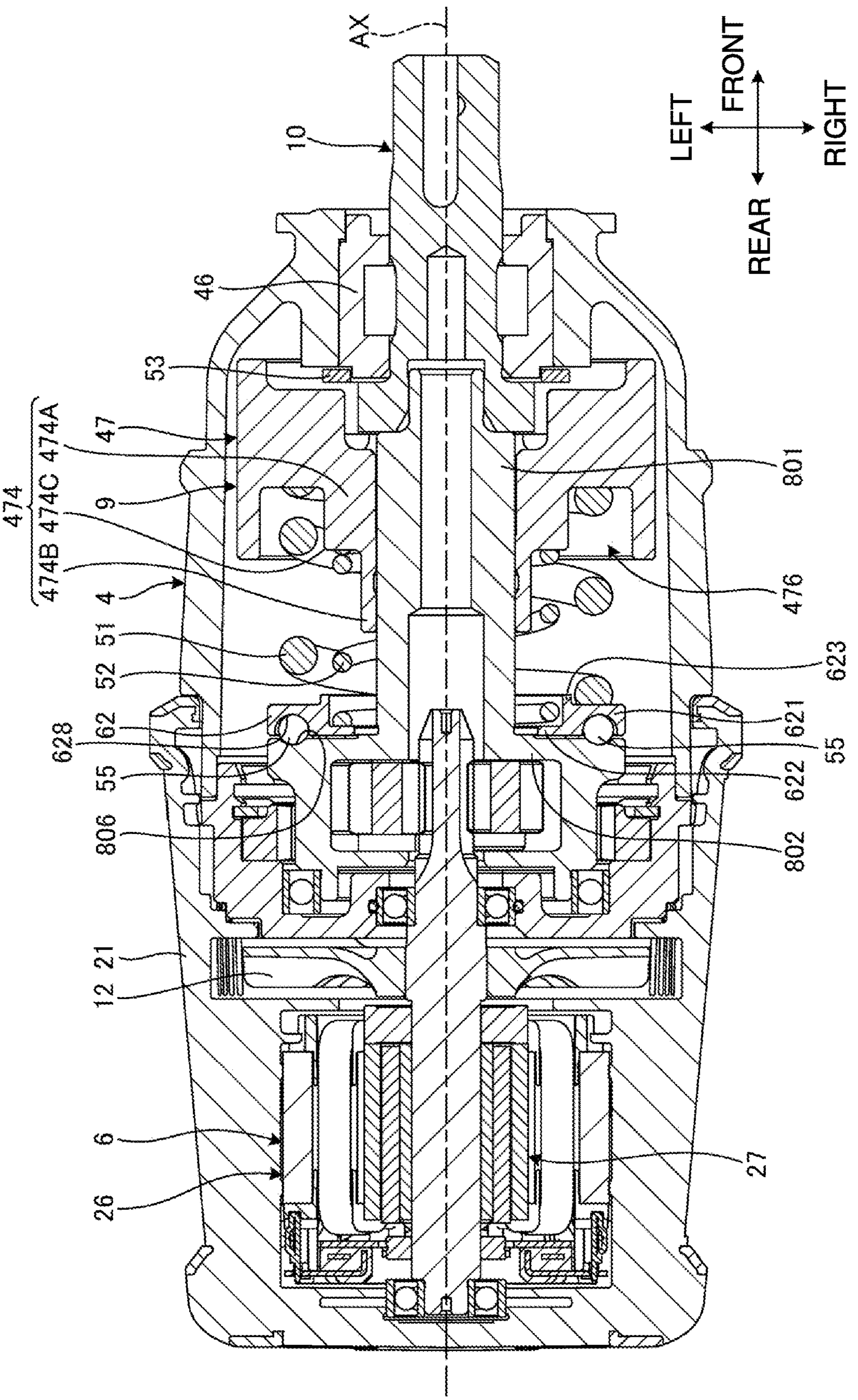
FIG. 16 is a horizontal sectional view of the upper portion of the impact tool according to the second embodiment.
Figure 17:
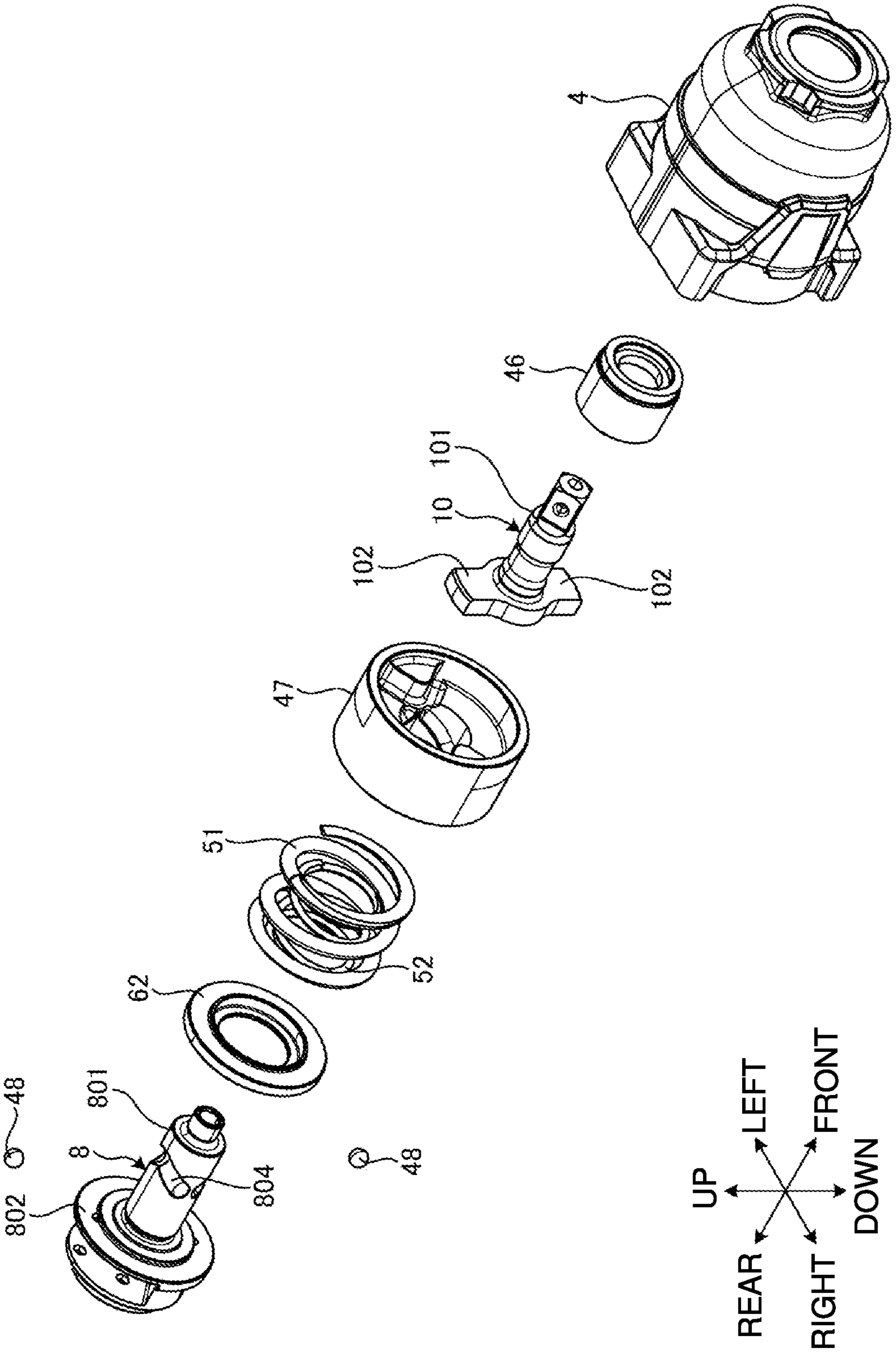
FIG. 17 is a partially exploded perspective view of the impact tool according to the second embodiment as viewed from the front.
Figure 18:
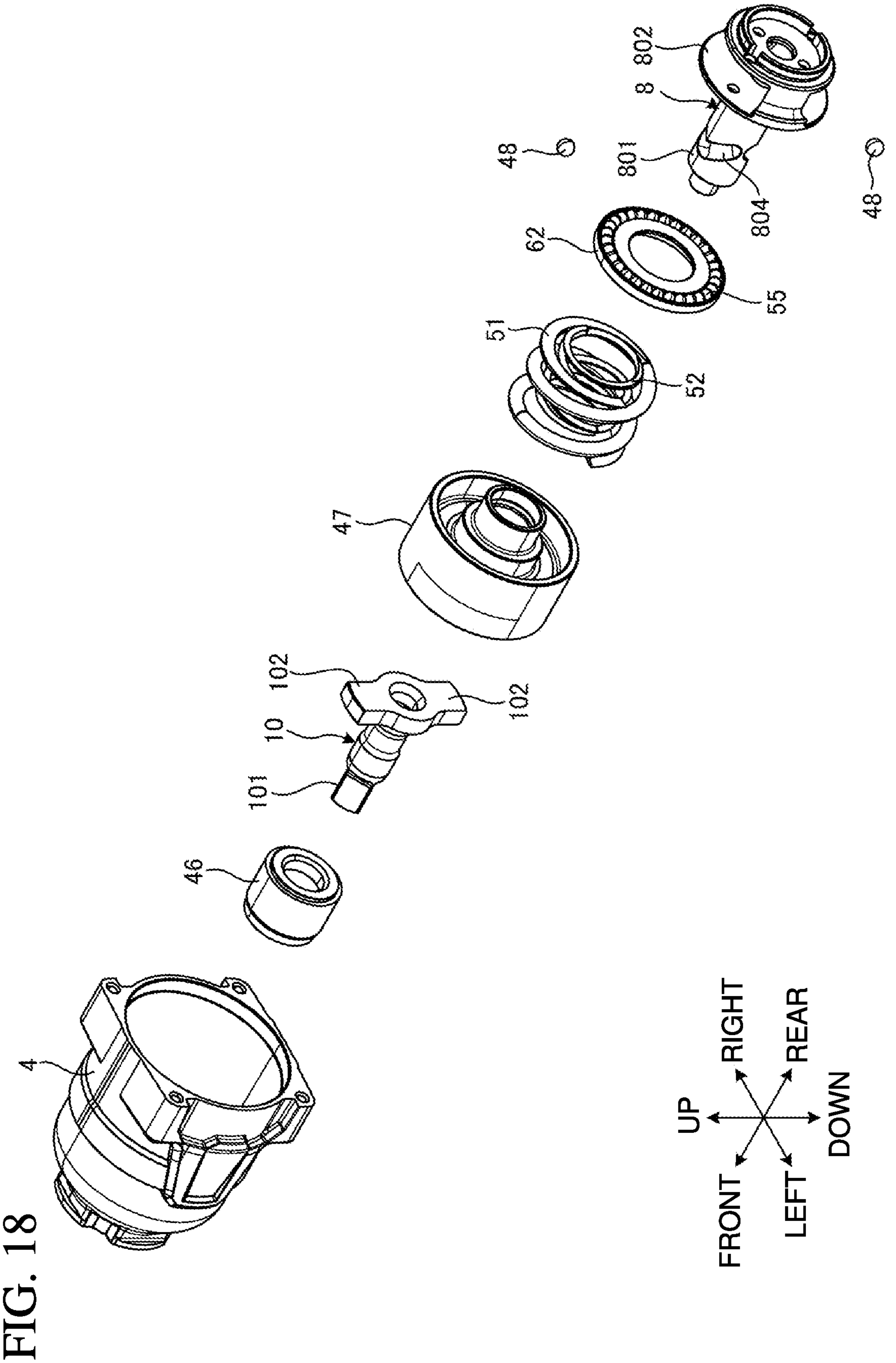
FIG. 18 is a partially exploded perspective view of the impact tool according to the second embodiment as viewed from the rear.
Figure 19:
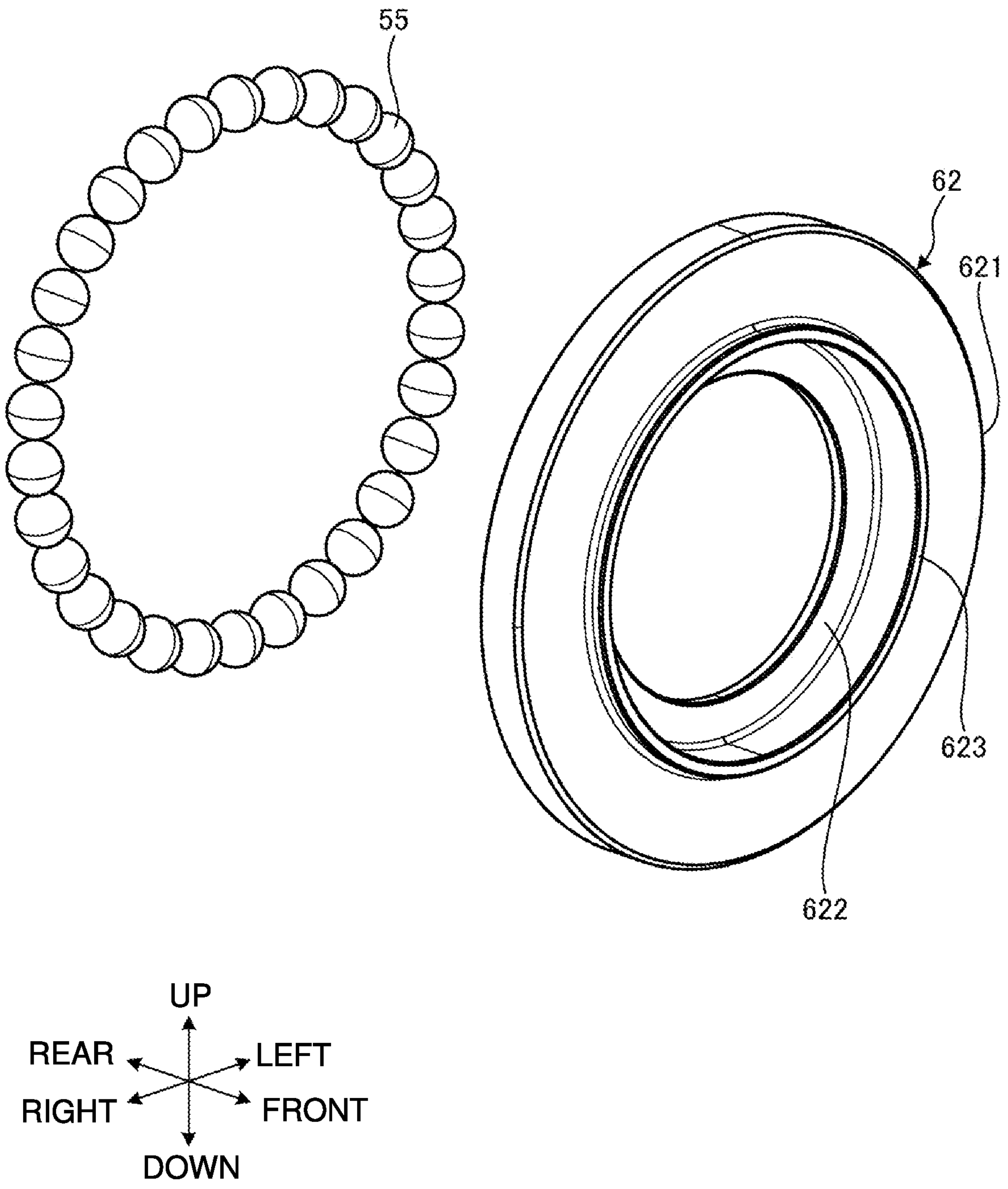
FIG. 19 is a perspective view of a washer and support balls in the second embodiment as viewed from the front.
Figure 20:
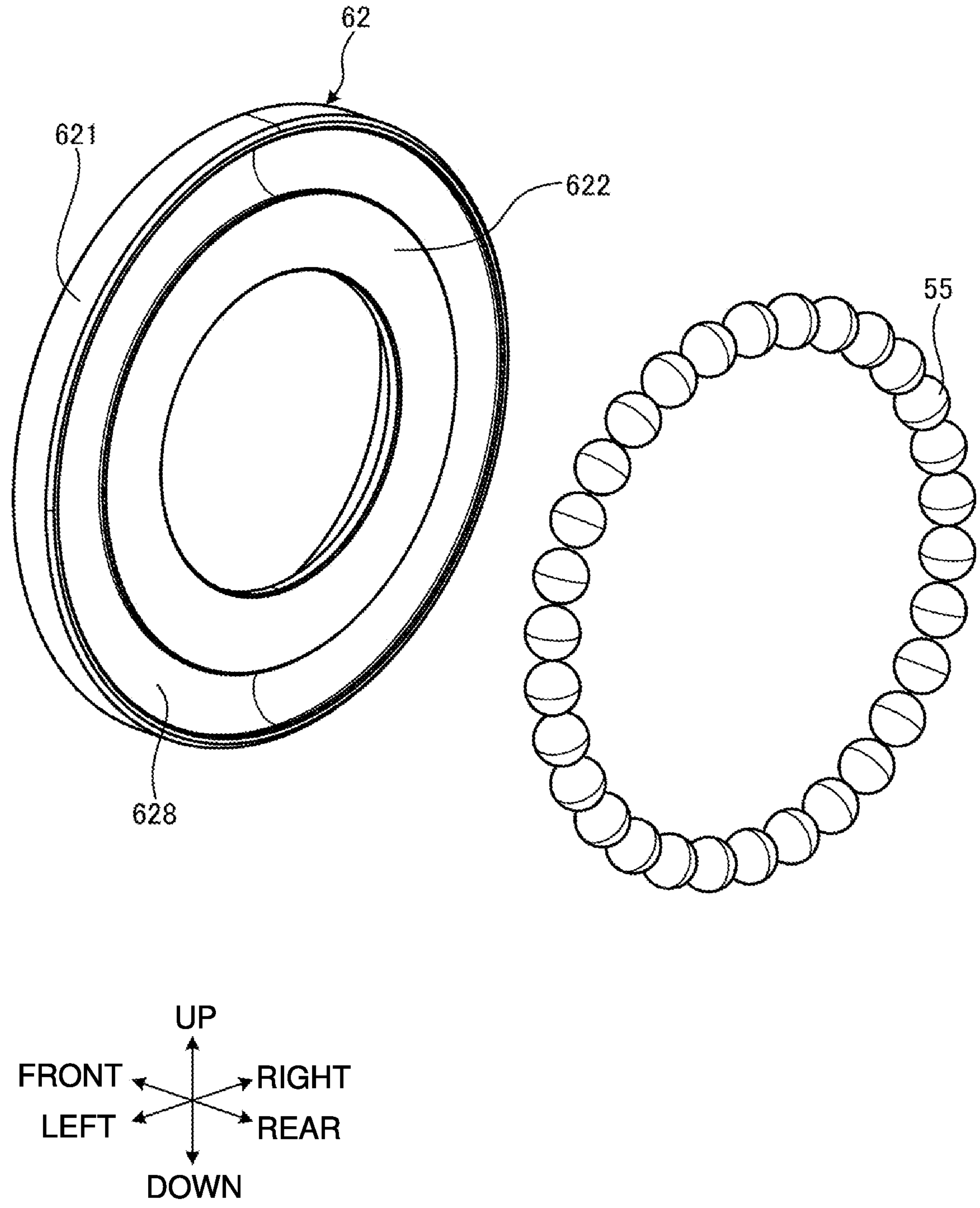
FIG. 20 is a perspective view of the washer and the support balls in the second embodiment as viewed from the rear.

FIG. 15 is a longitudinal sectional view of an upper portion of an impact tool 1 according to the present embodiment. FIG. 16 is a horizontal sectional view of the upper portion of the impact tool 1. FIG. 17 is a partially exploded perspective view of the impact tool 1 as viewed from the front. FIG. 18 is a partially exploded perspective view of the impact tool 1 as viewed from the rear. FIG. 19 is a perspective view of a washer 62 and support balls 55 as viewed from the front. FIG. 20 is a perspective view of the washer 62 and the support balls 55 as viewed from the rear.

As in the first embodiment, a first coil spring 51 and a second coil spring 52 surround a spindle shaft 801. The first coil spring 51 and the second coil spring 52 have their front ends received in a recess 476. A striker 9 in the present embodiment does not include a cup washer. The first coil spring 51 and the second coil spring 52 have their front ends received in the recess 476 and fixed by a hammer 47. The first coil spring 51 and the second coil spring 52 have their front ends fixed to the hammer 47 to be nonrotatable relative to the hammer 47.

In the present embodiment, the washer 62 faces the front surface of a flange 802. The washer 62 supports the rear end of the first coil spring 51 and the rear end of the second coil spring 52. The washer 62 is supported with the support balls 55 between the front surface of the flange 802 and the rear surface of the washer 62.

The washer 62 includes an annular base 621, an inner ring 622, and a front ring 623. The inner ring 622 protrudes radially inward from the rear end of the inner circumferential surface of the base 621. The front ring 623 protrudes frontward from an inner circumference of the front surface of the base 621. The base 621 has a support groove 628 on its rear surface. The support groove 628 receives the support balls 55. The support groove 628 is annular. The flange 802 has a support groove 806 on its front surface. The support groove 806 receives the support balls 55. The support groove 806 is annular. The multiple support balls 55 are between the support groove 628 and the support groove 806. The support balls 55 cause the washer 62 and the flange 802 to be spaced from each other.

The rear end of the first coil spring 51 is supported by the front surface of the base 621. The front ring 623 positions the rear end of the first coil spring 51 in the radial direction. The rear end of the second coil spring 52 is supported by the front surface of the inner ring 622. The inner circumferential surface of the base 621 positions the rear end of the second coil spring 52 in the radial direction.

When, for example, the anvil 10 receives a higher load in an operation for tightening a bolt, the anvil 10 and the hammer 47 stop rotating. When the spindle 8 rotates in this state, the hammer balls 48 move backward as being guided along the spindle groove 804 and the hammer groove 477.

When moving backward, the hammer 47 rotates relative to the spindle shaft 801. As the hammer 47 rotates, the first coil spring 51 and the second coil spring 52 rotate together. The washer 62 is spaced from the flange 802 included in the spindle 8. The rotation of the hammer 47 is thus not restricted by the flange 802. The support balls 55 are between the washer 62 and the flange 802. The support balls 55 rotate to allow the hammer 47 to rotate smoothly.

The impact tool 1 according to the present embodiment may include the motor 6, the spindle 8, the anvil 10, the hammer 47, the first coil spring 51 and the second coil spring 52, the washer 62, and the support balls 55. The spindle 8 may be rotatable with a rotational force from the motor 6 and include the spindle shaft 801 and the flange 802 at the rear of the spindle shaft 801. The anvil 10 may include the anvil shaft 101 located frontward from the spindle 8 to receive a tip tool, and the anvil projections 102 protruding radially outward from the anvil shaft 101. The hammer 47 may be supported by the spindle shaft 801 and include the hammer projections 475 to strike the anvil projections 102 in the rotation direction. The first coil spring 51 and the second coil spring 52 may surround the spindle shaft 801. The washer 62 may face the front surface of the flange 802 and support the rear end of the first coil spring 51 and the rear end of the second coil spring 52. The support balls 55 may be between the front surface of the flange 802 and the rear surface of the washer 62 and support the washer 62.

The above structure includes the washer 62 supporting the rear end of the first coil spring 51 and the rear end of the second coil spring 52. The impact tool 1 thus has less size increase in the axial direction parallel to the rotation axis AX of the motor 6. The washer 62 is supported by the support balls 54. When the spindle shaft 801 and the hammer 47 rotate relative to each other, the support balls 54 rotate to cause the hammer 47 to rotate smoothly. This improves the striking efficiency.

The washer 62 in the present embodiment may include the support groove 628 receiving the support balls 54.

In this structure, the single washer 62 supports the rear end of the first coil spring 51 and the rear end of the second coil spring 52. This structure includes the single support groove 628. The impact tool 1 thus has less size increase in the axial direction.

The washer 62 in the present embodiment may be spaced from the flange 802.

The rotation of the hammer 47 is thus not restricted by the flange 802, allowing the hammer 47 to rotate smoothly.

Other Embodiments

In the above embodiments, the impact tool 1 is an impact wrench. The impact tool 1 may be an impact driver.

In the above embodiments, the impact tool 1 may use utility power (alternating current power supply) instead of the battery pack 25.

REFERENCE SIGNS LIST

1 impact tool
2 housing
2L left housing
2R right housing
2S screw
2T screw
4 hammer case
6 motor
7 reducer
8 spindle
9 striker
10 anvil

12 fan
13 battery mount
14 trigger lever
15 forward-reverse switch lever
16 operation display
16A operation button
16B indicator
17 light
18 controller
19 inlet
20 outlet
21 motor compartment
22 grip
23 battery holder
24 bearing box
25 battery pack
26 stator
27 rotor
28 stator core
29 front insulator
30 rear insulator
31 coil
32 rotor core
33 rotor shaft
34 rotor magnet
37 sensor board
38 busbar unit
39 rotor bearing
39F front rotor bearing
39R rear rotor bearing
41 pinion gear
42 planetary gear
42P pin
43 internal gear
44 spindle bearing
46 anvil bearing
47 hammer
48 hammer ball
50 coil spring
51 first coil spring
52 second coil spring
53 washer
54 support ball
55 support ball
61 cup washer
62 washer
90 groove
101 anvil shaft
102 anvil projection
241 recess
242 protrusion
401 first cylinder
402 second cylinder
402R rear end
403 case connector
471 base
472 front ring
472F front end
473 rear ring
474 support ring
474A larger-diameter portion
474B smaller-diameter portion
474C step
475 hammer projection
476 recess
477 hammer groove
478 support groove
611 inner ring
612 outer ring
613 connecting ring
621 base
622 inner ring
623 front ring
628 support groove
801 spindle shaft
802 flange
802A first annular surface
802B second annular surface
802C third annular surface
802D step
802E step
803 protrusion
804 spindle groove
805 recess
806 support groove
AX rotation axis

What is claimed is:

1. An impact tool, comprising:
a motor;
a spindle rotatable with a rotational force from the motor, the spindle including
a spindle shaft, and
a flange at a rear of the spindle shaft;
an anvil including
an anvil shaft located frontward from the spindle to receive a tip tool, and
an anvil projection protruding radially outward from the anvil shaft;
a hammer supported by the spindle shaft, the hammer including
a hammer projection to strike the anvil projection in a rotation direction,
a recess at a rear of the hammer, and
a support groove inside the recess;
a first coil spring and a second coil spring surrounding the spindle shaft;
a cup washer located in the recess and supporting a front end of the first coil spring and a front end of the second coil spring; and
a support ball located in the support groove and supporting the cup washer.

2. The impact tool according to claim 1, wherein
the cup washer is spaced from the hammer and the spindle.

3. The impact tool according to claim 2, further comprising:
a hammer ball,
wherein the hammer includes
a base surrounding the spindle shaft,
a front ring protruding frontward from an outer circumference of the base,
a rear ring protruding rearward from the outer circumference of the base,
a support ring protruding rearward from an inner circumference of the base and supported by the spindle shaft with the hammer ball in between, and
a hammer projection protruding radially inward from an inner circumferential surface of the front ring to strike the anvil projection in the rotation direction, and
the recess includes
a rear surface of the base,
an inner circumferential surface of the rear ring, and
an outer circumferential surface of the support ring.

4. The impact tool according to claim 3, wherein the support groove is on the rear surface of the base.

5. The impact tool according to claim 4, wherein the support ball is located frontward from a rear end of the hammer ball.

6. The impact tool according to claim 5, wherein the front ring is located radially outward from the anvil projection, and the front ring is at the same position as at least a part of the anvil projection in an axial direction.

7. The impact tool according to claim 4, wherein the front ring is located radially outward from the anvil projection, and the front ring is at the same position as at least a part of the anvil projection in an axial direction.

8. The impact tool according to claim 3, wherein the front ring is located radially outward from the anvil projection, and the front ring is at the same position as at least a part of the anvil projection in an axial direction.

9. The impact tool according to claim 2, wherein the cup washer includes
an inner ring supporting the front end of the second coil spring,
an outer ring located radially outward and frontward from the inner ring and supporting the front end of the first coil spring, and
a connecting ring connecting an outer edge of the inner ring and an inner edge of the outer ring.

10. The impact tool according to claim 1, wherein the cup washer includes
an inner ring supporting the front end of the second coil spring,
an outer ring located radially outward and frontward from the inner ring and supporting the front end of the first coil spring, and
a connecting ring connecting an outer edge of the inner ring and an inner edge of the outer ring.

11. The impact tool according to claim 10, wherein the support ball is in contact with a front surface of the outer ring.

12. The impact tool according to claim 10, further comprising:
a hammer ball,
wherein the hammer includes
a base surrounding the spindle shaft,
a front ring protruding frontward from an outer circumference of the base,
a rear ring protruding rearward from the outer circumference of the base,
a support ring protruding rearward from an inner circumference of the base and supported by the spindle shaft with the hammer ball in between, and
a hammer projection protruding radially inward from an inner circumferential surface of the front ring to strike the anvil projection in the rotation direction, and
the recess includes
a rear surface of the base,
an inner circumferential surface of the rear ring, and
an outer circumferential surface of the support ring.

13. An impact tool, comprising:
a motor;
a spindle rotatable with a rotational force from the motor, the spindle including
a spindle shaft, and
a flange at a rear of the spindle shaft;
an anvil including
an anvil shaft located frontward from the spindle to receive a tip tool, and
an anvil projection protruding radially outward from the anvil shaft;
a hammer supported by the spindle shaft, the hammer including a hammer projection to strike the anvil projection in a rotation direction, the hammer configured to move rearward and rotate when the hammer projection strikes the anvil projection;
a first coil spring and a second coil spring surrounding the spindle shaft, the first coil spring and the second coil spring directly contacting the hammer so as to urge the hammer frontward;
a washer facing a front surface of the flange and supporting a rear end of the first coil spring and a rear end of the second coil spring; and
a support ball between the front surface of the flange and a rear surface of the washer, the support ball supporting the washer.

14. The impact tool according to claim 13, wherein the washer includes a support groove receiving the support ball.

15. The impact tool according to claim 14, wherein the washer is spaced from the flange.

16. The impact tool according to claim 13, wherein the washer is spaced from the flange.

17. The impact tool according to claim 13, wherein the first coil spring is located radially outward from the second coil spring, and the first coil spring has a greater spring constant than the second coil spring.

18. The impact tool according to claim 13, wherein the first coil spring is located radially outward from the second coil spring, and the first coil spring has a larger wire diameter than the second coil spring.

* * * * *